(12) United States Patent
Lai et al.

(10) Patent No.: US 10,324,724 B2
(45) Date of Patent: Jun. 18, 2019

(54) HARDWARE APPARATUSES AND METHODS TO FUSE INSTRUCTIONS

(71) Applicant: Intel Corporation, Santa Clara, CA (US)

(72) Inventors: Patrick P. Lai, Fremont, CA (US); Tyler N. Sondag, Santa Clara, CA (US); Sebastian Winkel, Los Altos, CA (US); Polychronis Xekalakis, San Jose, CA (US); Ethan Schuchman, Santa Clara, CA (US); Jayesh Iyer, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 134 days.

(21) Appl. No.: 14/971,904

(22) Filed: Dec. 16, 2015

(65) Prior Publication Data

US 2017/0177343 A1 Jun. 22, 2017

(51) Int. Cl.
*G06F 9/30* (2018.01)

(52) U.S. Cl.
CPC .............. *G06F 9/3017* (2013.01); *G06F 9/30* (2013.01); *G06F 9/3016* (2013.01); *G06F 9/30196* (2013.01)

(58) Field of Classification Search
CPC .............................. G06F 9/3017; G06F 9/3853
See application file for complete search history.

(56) References Cited

U.S. PATENT DOCUMENTS

| 7,398,372 | B2 | 7/2008 | Samra et al. | |
|---|---|---|---|---|
| 7,797,517 | B1 * | 9/2010 | Favor | G06F 9/30094 |
| | | | | 712/215 |
| 2003/0236966 | A1 * | 12/2003 | Samra | G06F 9/3017 |
| | | | | 712/209 |
| 2004/0034757 | A1 * | 2/2004 | Gochman | G06F 9/30145 |
| | | | | 711/219 |
| 2004/0139429 | A1 * | 7/2004 | Ronen | G06F 9/3001 |
| | | | | 717/159 |
| 2006/0190708 | A1 | 8/2006 | Schwarz et al. | |
| 2009/0031120 | A1 * | 1/2009 | Vaden | G06F 7/57 |
| | | | | 712/226 |

(Continued)

FOREIGN PATENT DOCUMENTS

WO WO 2017105735 A1 * 6/2017

OTHER PUBLICATIONS

S. Hu, J. E. Smith, "Using Dynamic Binary Translation to Fuse Dependent Instructions", Proc. of the 2nd Int'l Symp. on Code Generation and Optimization, pp. 213-224, Mar. 2004.*

(Continued)

*Primary Examiner* — John M Lindlof
(74) *Attorney, Agent, or Firm* — Nicholson De Vos Webster & Elliott LLP

(57) ABSTRACT

Methods and apparatuses relating to a fusion manager to fuse instructions are described. In one embodiment, a hardware processor includes a hardware binary translator to translate an instruction stream into a translated instruction stream, a hardware fusion manager to fuse multiple instructions of the translated instruction stream into a single fused instruction, a hardware decode unit to decode the single fused instruction into a decoded, single fused instruction, and a hardware execution unit to execute the decoded, single fused instruction.

24 Claims, 19 Drawing Sheets

(56) References Cited

U.S. PATENT DOCUMENTS

| | | | |
|---|---|---|---|
| 2010/0312991 A1 | 12/2010 | Norden et al. | |
| 2011/0264896 A1* | 10/2011 | Parks | G06F 9/30145 712/221 |
| 2011/0264897 A1* | 10/2011 | Henry | G06F 9/30007 712/226 |
| 2013/0283249 A1 | 10/2013 | Kanhere et al. | |
| 2014/0047221 A1* | 2/2014 | Irwin | G06F 9/30181 712/226 |
| 2014/0149722 A1* | 5/2014 | Brown | G06F 9/30167 712/226 |
| 2014/0281389 A1* | 9/2014 | Loktyukhin | G06F 9/30196 712/206 |
| 2014/0351561 A1 | 11/2014 | Parks et al. | |
| 2015/0026671 A1* | 1/2015 | Lupon | G06F 8/443 717/153 |
| 2016/0313997 A1* | 10/2016 | Gschwind | G06F 9/3017 |
| 2017/0123808 A1* | 5/2017 | Caulfield | G06F 9/3867 |

OTHER PUBLICATIONS

Evans, James S., and Gregory L. Trimper. Itanium architecture for programmers: understanding 64-bit processors and EPIC principles. Prentice Hall Professional, 2003.*

Smith, J. E. "Future Superscalar Processors Based on Instruction Compounding."*

Cheng, Allen C. "Accelerating embedded multimedia applications with versatile and reconfigurable instruction fusion." Multimedia, 2007. ISM 2007. Ninth IEEE International Symposium on. IEEE, 2007.*

Gochman, Simcha. "The intel pentium m processor: Microarchitecture and performance." Intel technology journal 7.2 (2003): 21-36.*

Hu, Shiliang, and James E. Smith. "Reducing startup time in co-designed virtual machines." ACM SIGARCH Computer Architecture News. vol. 34. No. 2. IEEE Computer Society, 2006.*

Hu, Shiliang, et al. "An approach for implementing efficient superscalar CISC processors." High-Performance Computer Architecture, 2006. The Twelfth International Symposium on. IEEE, 2006.*

Hu, Shiliang. Efficient binary translation in co-designed virtual machines. Diss. University of Wisconsin—Madison, 2006.).*

Le, Bich C. "An out-of-order execution technique for runtime binary translators." ACM SIGOPS Operating Systems Review. vol. 32. No. 5. ACM, 1998.*

Stark, Jared, Mary D. Brown, and Yale N. Patt. "On pipelining dynamic instruction scheduling logic." Proceedings of the 33rd annual ACM/IEEE international symposium on Microarchitecture. ACM, 2000.*

"Intel 64 and IA-32 Architectures Software Developer's Manual," Documentation Changes, Document No. 252046-048, Sep. 2015, 478 pages.

Intel Architecture, Instruction Set Extensions Programming Reference, Ref. # 319433-023, Aug. 2015, 1178 pages.

International Search Report and Written Opinion for Application No. PCT/US2016/062243, dated Feb. 23, 2017, 9 pages.

* cited by examiner

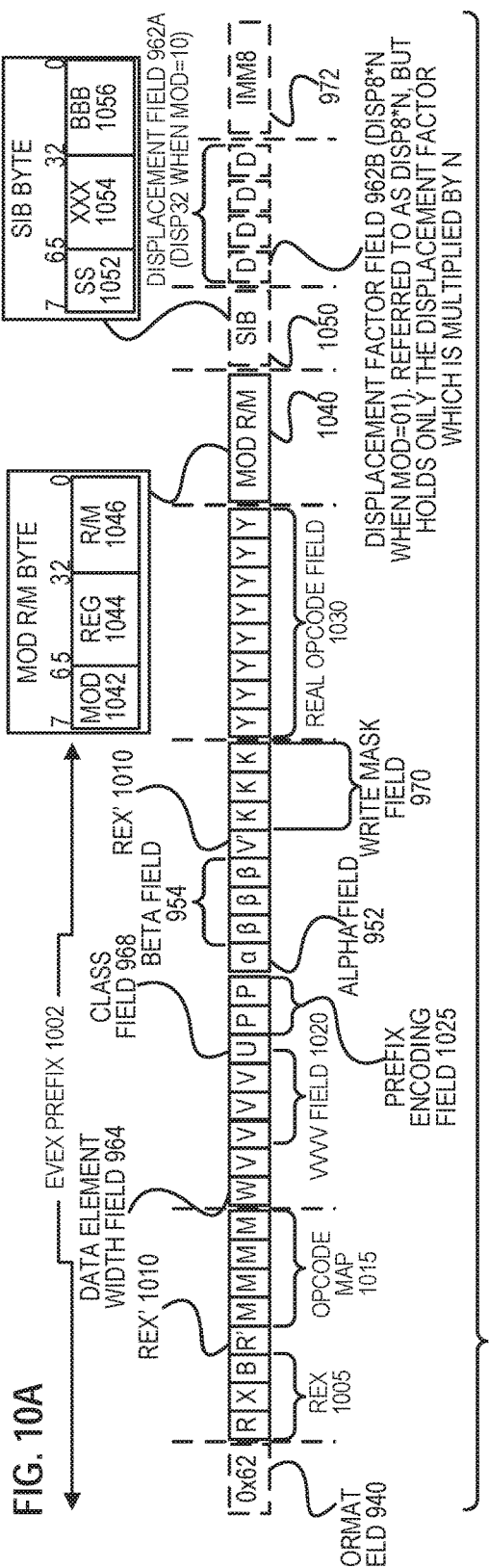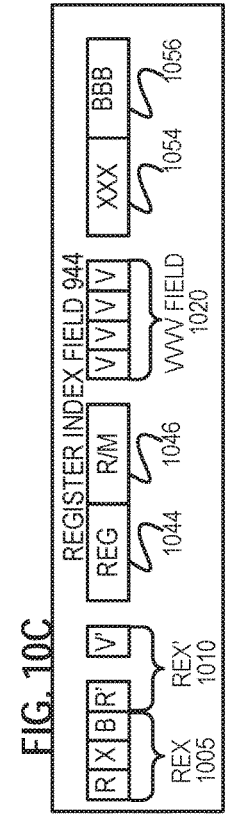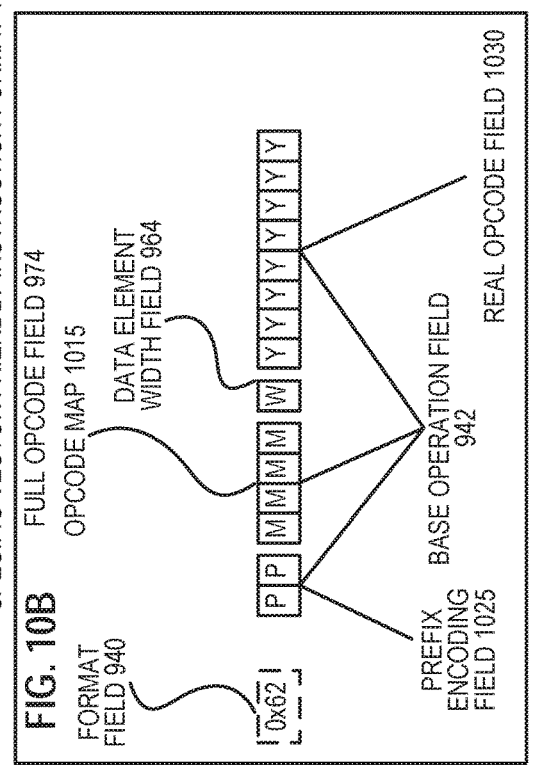

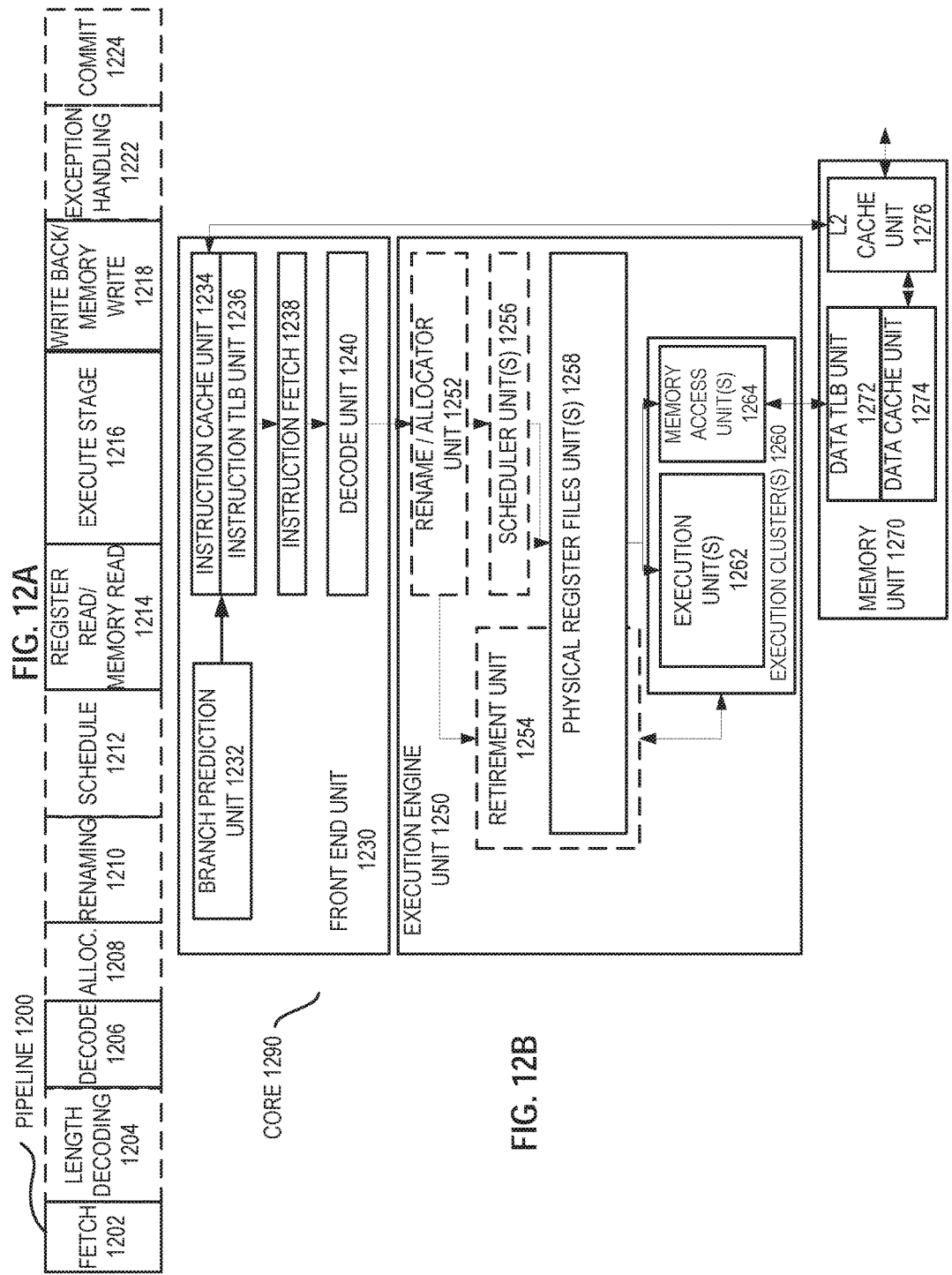

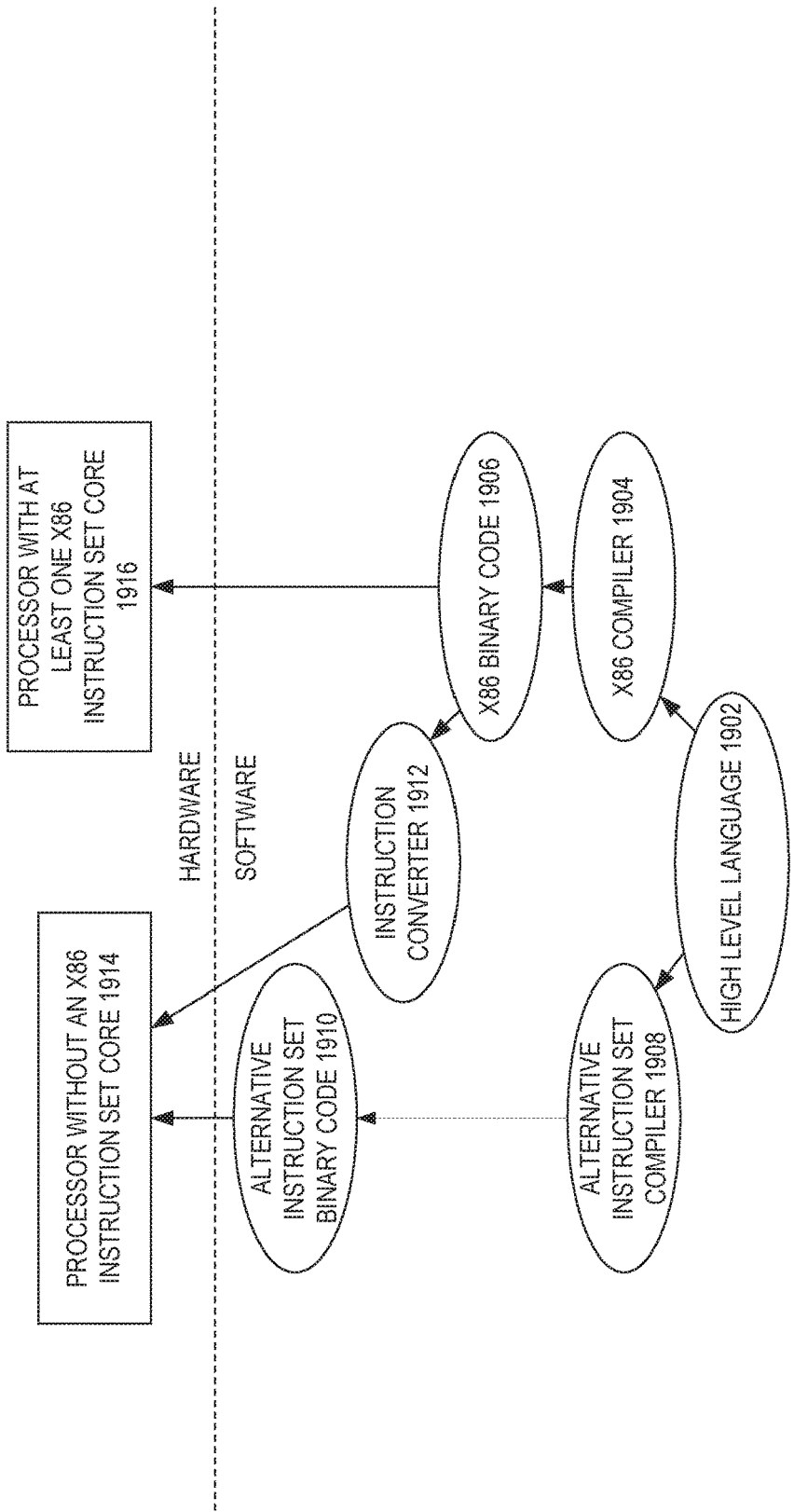

HARDWARE APPARATUSES AND METHODS TO FUSE INSTRUCTIONS

TECHNICAL FIELD

The disclosure relates generally to electronics, and, more specifically, an embodiment of the disclosure relates to a hardware fusion manager to fuse instructions from a binary translator.

BACKGROUND

A processor, or set of processors, executes instructions from an instruction set, e.g., the instruction set architecture (ISA). The instruction set is the part of the computer architecture related to programming, and generally includes the native data types, instructions, register architecture, addressing modes, memory architecture, interrupt and exception handling, and external input and output (I/O). It should be noted that the term instruction herein may refer to a macro-instruction, e.g., an instruction that is provided to the processor for execution, or to a micro-instruction, e.g., an instruction that results from a processor's decoder decoding macro-instructions.

BRIEF DESCRIPTION OF THE DRAWINGS

The present disclosure is illustrated by way of example and not limitation in the figures of the accompanying drawings, in which like references indicate similar elements and in which:

FIG. 10A is a block diagram illustrating fields for the generic vector friendly instruction formats in FIGS. 9A and 9B according to embodiments of the disclosure.

FIG. 10B is a block diagram illustrating the fields of the specific vector friendly instruction format in FIG. 10A that make up a full opcode field according to one embodiment of the disclosure.

FIG. 10C is a block diagram illustrating the fields of the specific vector friendly instruction format in FIG. 10A that make up a register index field according to one embodiment of the disclosure.

FIG. 12A is a block diagram illustrating both an exemplary in-order pipeline and an exemplary register renaming, out-of-order issue/execution pipeline according to embodiments of the disclosure.

FIG. 12B is a block diagram illustrating both an exemplary embodiment of an in-order architecture core and an exemplary register renaming, out-of-order issue/execution architecture core to be included in a processor according to embodiments of the disclosure.

FIG. 19 is a block diagram contrasting the use of a software instruction converter to convert binary instructions in a source instruction set to binary instructions in a target instruction set according to embodiments of the disclosure.

DETAILED DESCRIPTION

Figure 1:
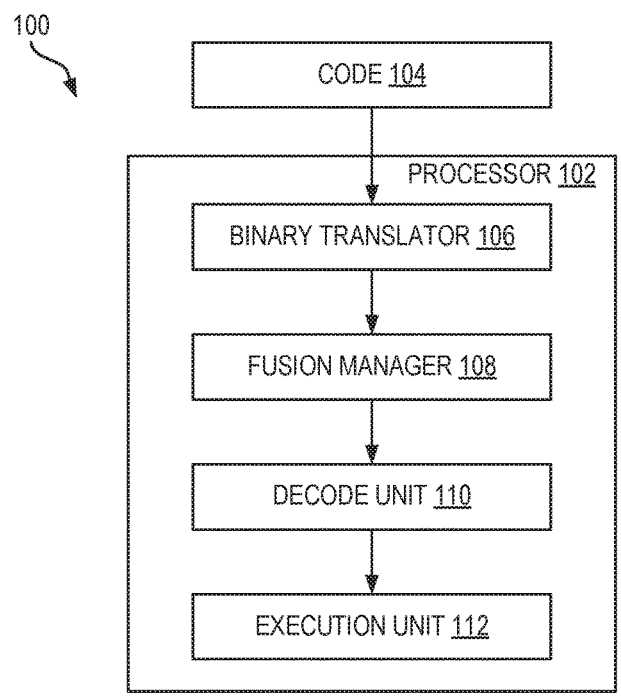
FIG. 1 illustrates a hardware processor including a hardware binary translator and a hardware fusion manager according to embodiments of the disclosure.

In the following description, numerous specific details are set forth. However, it is understood that embodiments of the disclosure may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

A (e.g., hardware) processor (e.g., having one or more cores) may execute instructions to operate on data, for example, to perform arithmetic, logic, or other functions. Code (e.g., software) to be executed on a processor may be translated from one format to another format. A (e.g., dynamic) binary translator may be utilized to translate code (e.g., an instruction) from one format to another format. A (e.g., dynamic) binary translator may be utilized to translate code (e.g., an instruction) from multiple formats to a single format. A binary translator may translate code (e.g., an instruction) from a guest format to a host format. A binary translator may translate an instruction of a first ISA into an instruction of a second ISA. A binary translator may translate (e.g., an x86 format) macro-instruction(s) into micro-instruction(s). An instruction may translate into a plurality of translated instructions, e.g., a one-to-one correspondence is not required in one embodiment. Multiple instructions may translate into one translated instruction or a number of translated instructions that is less than the number of multiple (e.g., untranslated) instructions, e.g., a one-to-one correspondence is not required in one embodiment. A binary translator may translate a software instruction (e.g., in binary code) into a hardware instruction (e.g., in binary code), for example, for execution on a hardware processor. A (e.g., dynamic) binary translator may include hardware, software, firmware, or any combination thereof. A (e.g., dynamic) binary translator may translate one instruction (e.g., in source binary code complying with the architecture of a source processor (source architecture)) into a translated instruction (e.g., into target binary code complying with the architecture of a target processor (target architecture)). A dynamic binary translation process may take place during execution of the source binary code (e.g., at run time).

In certain embodiments, it may be desired to fuse a plurality of (e.g., two) instructions into a single instruction. In certain embodiments, the fusing discussed herein may increase the performance (e.g., by having fewer instructions to execute) of a binary translation based processor (e.g., processor system) versus a processor that executes a native ISA without binary translation. Certain embodiments herein may increase the code density and/or efficiency of the binary instruction stream for execution on a binary translation based processor. For example, embodiments herein may reduce the number of instructions (e.g., macro-instruction) from two to one. Certain embodiments may reduce the load (e.g., pressure) on instruction scheduling and/or book-keeping hardware, for example, a reorder buffer(s) and reservation station(s). Certain embodiments may reduce the load (e.g., pressure) on register allocation, for example, with the translator and/or with a hardware allocator, e.g., by the fusing of a first and second instruction eliminating the write back of the result of the first instruction into an intermediate register to be used (e.g., read) by the second (e.g., subsequent) instruction. Certain embodiments of a binary translator based processor herein may reduce the (e.g., instruction) cache footprint and/or reduce the usage of instruction fetch and/or decoding bandwidth. Certain embodiments herein may improve code (e.g., instruction) density. Certain embodiments herein may utilize a processor's decode (e.g., cracking) unit, which may be (e.g., highly) efficient in breaking macro-instructions or macro-operations into native (e.g., to the hardware processor's ISA) micro-instructions and/or micro-operations (e.g., that the processor core is designed to handle). Certain embodiments may reduce the scope of any hardware changes in a binary translation based processor, e.g., while preserving the efficiency of the base design from which the binary translation enabled processor is derived.

In certain embodiments, a fusion manager may be included to fuse a plurality of (e.g., two) instructions into a single instruction. In one embodiment, a fusion manager may be implemented in hardware, software, firmware, or any combination thereof. In one embodiment, a fusion manager may fuse a plurality of macro-instructions into a single macro-instruction, for example, before any of the macro-instructions are decoded and/or executed. The single, fused instruction may generate (e.g., from its execution) the same result or results (e.g., resultant or resultants) as the unfused, plurality of instructions. In one embodiment, a fusion manager is to detect a plurality (e.g., a pair) of instructions that may be fused, e.g., without destroying (e.g., overwriting) any data that a subsequent instruction (e.g., in execution order) is to access (e.g., read). For example, a fusion manager may detect an instruction to perform an arithmetic and/or bitwise logical operation, e.g., utilizing an arithmetic logic unit (ALU) of a processor. An ALU may operate on integer numbers and/or floating point numbers (e.g., which may be referred to as a floating point unit (FPU)). An ALU may not include a memory unit and/or a branch (e.g., prediction) unit. In one embodiment, an arithmetic and/or bitwise logical operation instruction is not (e.g., only) a load instruction and/or a store instruction.

In one embodiment, a fusion manager may detect a zero extending load instruction (e.g., macro-instruction) and an instruction (e.g., macro-instruction) that is to read the result (for example, a same location where the result was stored) of the zero extending load instruction and fuse them into a single instruction (e.g., macro-instruction). For example, a fusion manager may detect a zero extending load instruction and an arithmetic and/or bitwise logical operation instruction (e.g., an add, subtract, multiply, or divide) that is to read the result of the zero extending load instruction. When executed, a zero extending load instruction may only perform a zero extending load operation or may also include other operations. When executed, a zero extending load instruction may load a value (e.g., of a certain number of bits) and zero extend that value (e.g., add zeros in addition to the certain number of bits to obtain a larger size). For example, a value may be loaded that does not utilize all of the bits of a register and the value may have zeros included in the other bit positions (e.g., in the higher significant bit positions when the value is the lower significant bit positions) to fill up each bit position of the register. Additionally or alternatively, a fusion manager may detect an instruction (e.g., macro-instruction) that is to produce a result and a store (e.g., write) instruction (e.g., macro-instruction) that is to read the result and fuse them into a single instruction (e.g., macro-instruction). When executed, a store instruction may only perform a store operation or may also include other operations. In one embodiment, when executed, a store instruction performs a store operation but not any other (e.g., arithmetic and/or bitwise logical) operations. In one embodiment, when executed, a store instruction is a move instruction that performs a move operation but not any other (e.g., arithmetic and/or bitwise logical) operations.

In one embodiment, an instruction (e.g., two or more instructions to be fused into a single instruction) operates on scalar data, e.g., not vector data. For example, an instruction may be a single instruction, single data (SISD) instruction, e.g., and not a single instruction, multiple data (SIMD) instruction. In certain embodiments, an instruction may operate on operands in a direct addressing mode and/or an indirect addressing mode. In certain embodiments, an instruction may operate on operands in a register or registers, e.g., where the registers are addressed via a register name (e.g., memory may not be accessed in direct register addressing or memory may be accessed in indirect register addressing).

In one embodiment, a (e.g., dynamic) binary translator may translate an instruction stream (e.g., a section of an instruction stream) into a translated instruction stream. A binary translator may assign the (e.g., hardware) resources that an instruction may use (e.g., a dynamic binary translator may assign resources during runtime of the processor). For example, a binary translator may assign the particular register or registers of a hardware processor that are to be utilized in executing a stream of instructions, for example, register(s) storing an input and/or register(s) to store a result (e.g., output). A stream of instructions may generally refer to a section of instructions (e.g., a thread). In one embodiment, a stream of instructions is a block of instructions, e.g., a block of less than about 2, 3, 4, 5, 6, 7, 8, 9, 10, 15, 20, 25, 30, 35, 40, 45, 50, 75, 100, 200, 300, 400, 500, 1000, etc. instructions. For example, a stream of instructions may be a (e.g., consecutive) block of instructions that does not include each instruction in a software application. In one embodiment, during the translation stage of a binary translation, a fusion manager may produce a stream of binary translated instructions (e.g., chain of instructions) and then detect and fuse a plurality of (e.g., two) those instructions into a single instruction, for example, so a decode unit of a processor may then decode the single instruction.

FIG. 1 illustrates a system 100 including a hardware processor 102 having a hardware binary translator 106 and a hardware fusion manager 108 according to embodiments of the disclosure. Hardware binary translator may be a circuit to perform a binary translation. Hardware fusion manager may be a circuit to perform a fusion, e.g., as discussed herein. Code 104 (e.g., software) may be received by the processor 102, e.g., code from a compiler. Code 104 may be in a first format, for example, as discussed above. Code (e.g., a block of code) may be input into hardware (e.g., dynamic) binary translator 106 of processor 102. Hardware (e.g., dynamic) binary translator 106 may perform a binary translation of the code (e.g., instruction stream) from one format to a second format, for example, as discussed above. The translated code (e.g., instruction stream) from the binary translator 106 may be output to the hardware fusion manager 108. In one embodiment, the processor 102 includes storage (e.g., a buffer) to store the translated code. The fusion manager may view (e.g., scan) the translated code (e.g., instruction stream) and detect multiple instructions of the translated code that may be fused into a single instruction, for example, as discussed further below in reference to FIGS. 5-6 and 7-8. In one embodiment, a fusion manager may detect certain instructions by viewing (e.g., scanning) the opcode of each instruction, for example, and comparing that opcode to a list of opcodes for instructions that may be combined. Fusion manager may include logic (e.g., a circuit) to detect two or more instructions that may be fused together into a single instruction. Fusion manager may include logic (e.g., a circuit) to fuse two or more instructions into a single instruction, for example, after detection. Example embodiments of detecting and fusing are discussed below in reference to FIGS. 5-8. In one embodiment, fusion manager may detect which instruction(s) are to overwrite (e.g., destroy) data (e.g., a result) of an instruction, for example, if a first instruction's result(s) (e.g., the result value or the address of the memory location storing the result, which may be used in indirect register addressing) is to be overwritten by a second (e.g., in program order or in the order of execution, which may be in an out-of-order processor) instruction. One or more single, fused instructions (e.g., and other non-fused instructions) may be decoded in the decode unit 110 of the processor 102. One or more decoded, single fused instructions (e.g., and other decoded, non-fused instructions) may be executed in the execution unit 112 of the processor 102.

Figure 2:
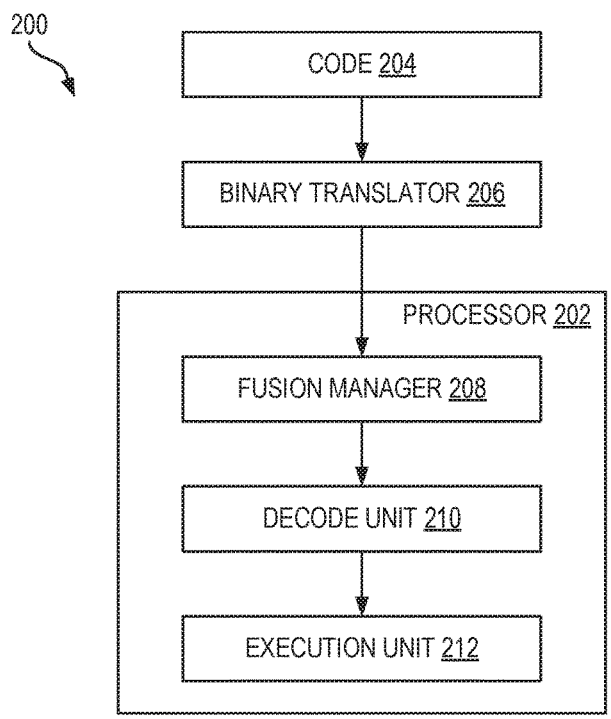
FIG. 2 illustrates a hardware processor including a hardware fusion manager according to embodiments of the disclosure.

FIG. 2 illustrates a system 200 including a hardware processor 202 having a hardware fusion manager 208 according to embodiments of the disclosure. Binary translator may be separate from the processor, e.g., in hardware, software, firmware, or any combination thereof. Binary translator may provide an output of translated code (e.g., a translated instruction stream) to the processor (e.g., the hardware fusion manger 208 of the processor 202). Hardware fusion manager may be a circuit to perform a fusion, e.g., as discussed herein. Code 204 (e.g., software) may be received by the binary translator 206, e.g., code from a compiler. Code 204 may be in a first format, for example, as discussed above. Code (e.g., a block of code) may be input into (e.g., dynamic) binary translator 206. Binary translator 206 may perform a binary translation of the code (e.g., instruction stream) from one format to a second format, for example, as discussed above. The translated code (e.g., instruction stream) from the binary translator 206 may be output to the hardware fusion manager 208 of the processor 202. In one embodiment, the processor 202 includes storage (e.g., a buffer) to store the translated code. The fusion manager may view (e.g., scan) the translated code (e.g., instruction stream) and detect multiple instructions of the translated code that may be fused into a single instruction, for example, as discussed further below in reference to FIGS. 5-6 and 7-8. In one embodiment, a fusion manager may detect certain instructions by viewing (e.g., scanning) the opcode of each instruction, for example, and comparing that opcode to a list of opcodes for instructions that may be combined. Fusion manager may include logic (e.g., a circuit) to detect two or more instructions that may be fused together into a single instruction. Fusion manager may include logic (e.g., a circuit) to fuse two or more instructions into a single instruction. For example, detection and fusing embodiments are discussed below in reference to FIGS. 5-8. In one embodiment, fusion manager may detect which instruction(s) are to overwrite (e.g., destroy) data (e.g., a result) of an instruction, for example, if a first instruction's result(s) (e.g., the result value or the address of the memory location storing the result, which may be used in indirect register addressing) is to be overwritten by a second (e.g., in program order or in the order of execution, which may be in an out-of-order processor) instruction. One or more single, fused instructions (e.g., and other non-fused instructions) may be decoded in the decode unit 210 of the processor 202. One or more decoded, single fused instructions (e.g., and other decoded, non-fused instructions) may be executed in the execution unit 212 of the processor 202.

Figure 3:
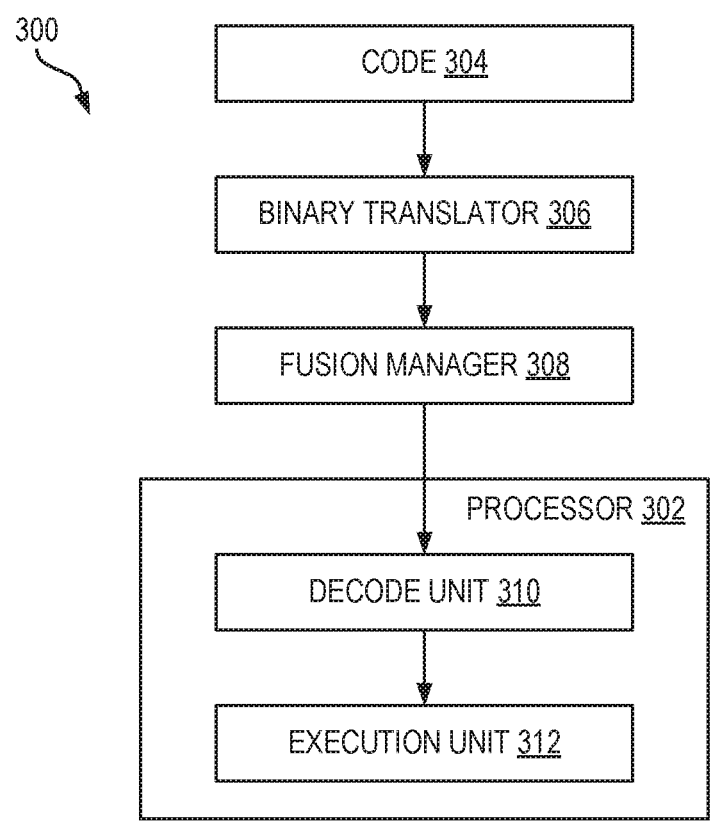
FIG. 3 illustrates a hardware processor according to embodiments of the disclosure.

FIG. 3 illustrates a system 300 including a hardware processor 302 according to embodiments of the disclosure. Binary translator may be separate from the processor, e.g., in hardware, software, firmware, or any combination thereof. Binary translator may provide an output of translated code (e.g., a translated instruction stream) to the fusion manger 308. Fusion manager may be separate from the processor, e.g., in hardware, software, firmware, or any combination thereof. Fusion manager may operate according to any of the methods discussed herein. Code 304 (e.g., software) may be received by the binary translator 306, e.g., code from a compiler. Code 304 may be in a first format, for example, as discussed above. Code (e.g., a block of code) may be input into binary translator 306. Binary translator 306 may perform a binary translation of the code (e.g., instruction stream) from one format to a second format, for example, as discussed above. The translated code (e.g., instruction stream) from the binary translator 306 may be output to the fusion manager 308. In one embodiment, the system 300 includes storage (e.g., a buffer) to store the translated code. The fusion manager may view (e.g., scan) the translated code (e.g., instruction stream) and detect multiple instructions of the translated code that may be fused into a single instruction, for example, as discussed further below in reference to FIGS. 5-6 and 7-8. In one embodiment, a fusion manager may detect certain instructions by viewing (e.g., scanning) the opcode of each instruction, for example, and comparing that opcode to a list of opcodes for instructions that may be combined. Fusion manager may include logic (e.g., a circuit) to detect two or more instructions that may be fused together into a single instruction. Fusion manager may include logic (e.g., a circuit) to fuse two or more instructions into a single instruction. For example, detection and fusing embodiments are discussed below in reference to FIGS. 5-8. In one embodiment, fusion manager may detect which instruction(s) are to overwrite (e.g., destroy) data (e.g., a result) of an instruction, for example, if a first instruction's result(s) (e.g., the result value or the address of the memory location storing the result, which may be used in indirect register addressing) is to be overwritten by a second (e.g., in program order or in the order of execution, which may be in an out-of-order processor) instruction. One or more single, fused instructions (e.g., and other non-fused instructions) may be decoded in the decode unit 310 of the processor 302. One or more decoded, single fused instructions (e.g., and other decoded, non-fused instructions) may be executed in the execution unit 312 of the processor 302. In one embodiment, a fusion manager may perform a fusion operation before any decoding (e.g., by the decode unit) and/or execution (e.g., by the execution unit). In one embodiment, the (e.g., dynamic) fusion manager may be located after the decode unit.

Figure 4:
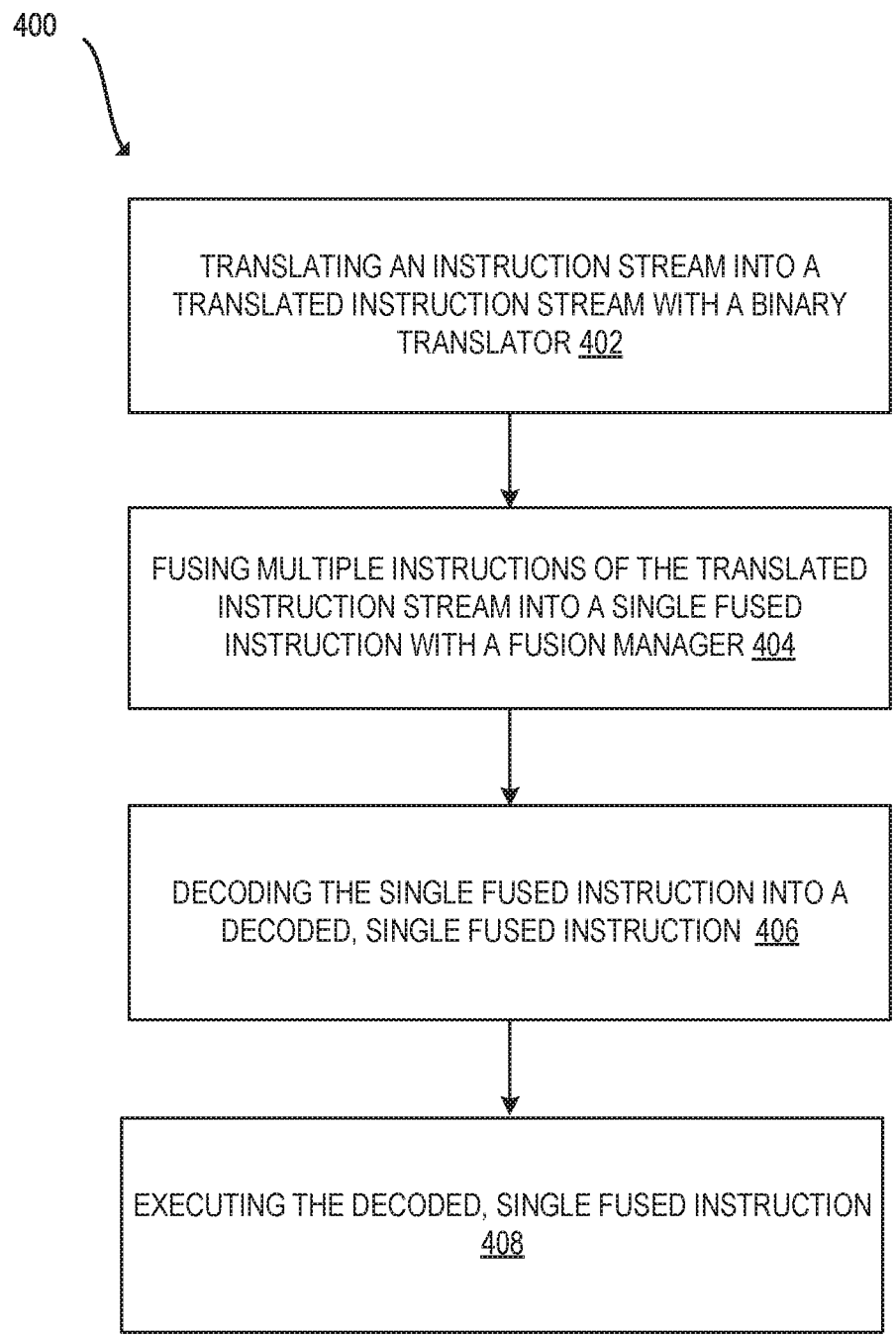
FIG. 4 illustrates a flow diagram of a fusion operation according to embodiments of the disclosure.

FIG. 4 illustrates a flow diagram 400 of a fusion operation according to embodiments of the disclosure. Flow diagram 400 includes translating an (e.g., macro-instruction) instruction stream into a translated (e.g., macro-instruction) instruction stream with a binary translator 402, fusing multiple (e.g., macro-instruction) instructions of the translated (e.g., macro-instruction) instruction stream into a single fused (e.g., macro-instruction) instruction with a fusion manager 404, decoding the single fused (e.g., macro-instruction) instruction into a decoded, single fused instruction with a hardware decode unit of a hardware processor 406, and executing the decoded, single fused (e.g., macro-instruction) instruction with a hardware execution unit of the hardware processor 408.

Figure 5:
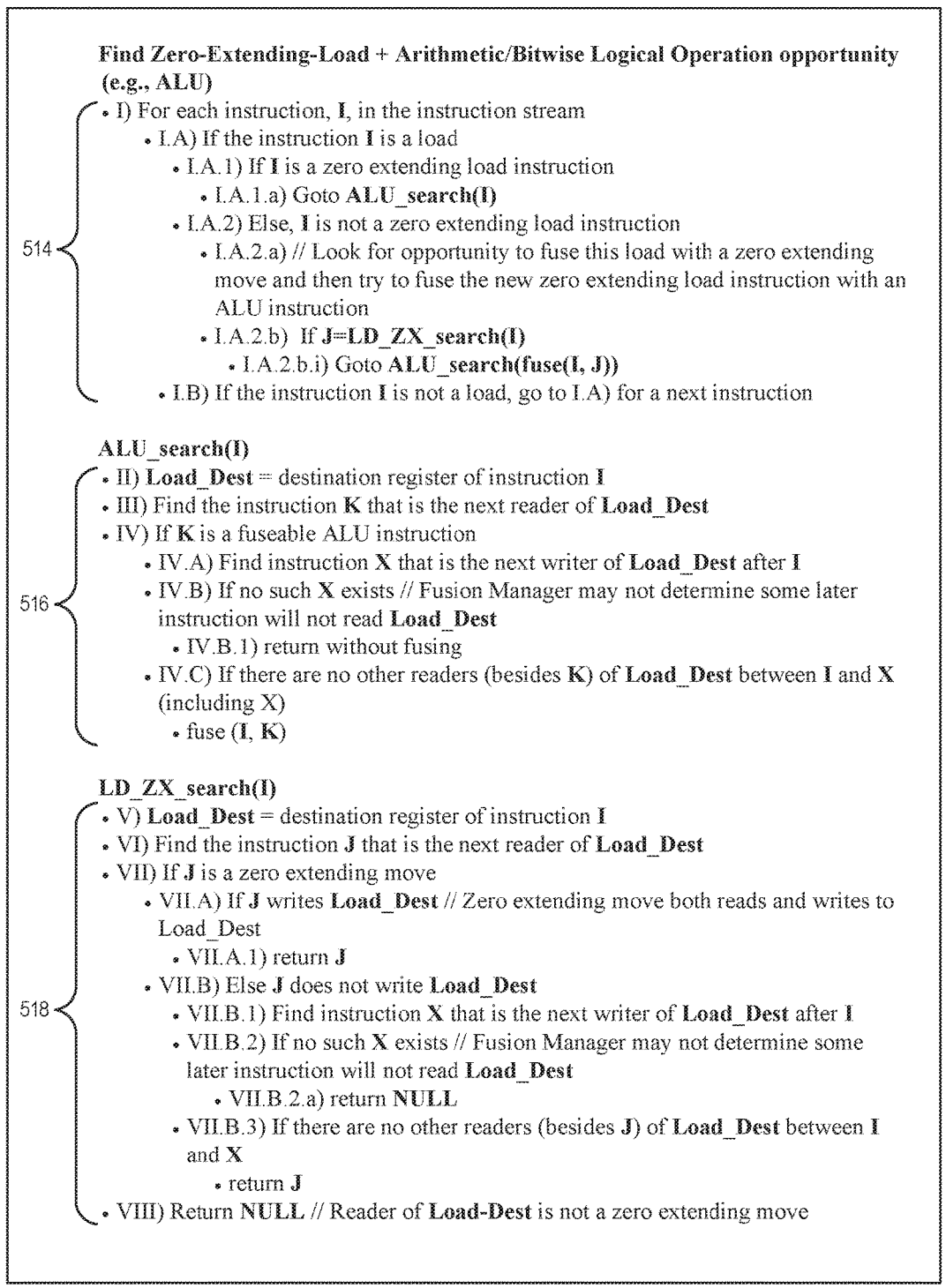
FIG. 5 illustrates pseudocode of a fusion operation according to embodiments of the disclosure.

FIG. 5 illustrates pseudocode 500 of a fusion operation according to embodiments of the disclosure. In one embodiment, each and/or all sections (514, 516, 518) of pseudocode may be a software routine or performed by a hardware circuit (e.g., logic). Pseudocode 500 illustrates one example of pseudocode that a fusion manager may utilize in the detection and/or fusing of instructions (e.g., macro-instructions). For example, data may be stored (e.g., in memory) at a different size (e.g., number of bits) than what is used by (e.g., ALU) operations on the data, for example, data may be stored as a single byte (8 bits), but then extended to multiple bytes, e.g., 4 bytes (32 bits) or 8 bytes (64 bits), before other operations are performed on the data. Thus, code (e.g., an instruction stream) may include a zero extending load instruction to load a value of data (e.g., from a register or other memory) and zero-extend it, e.g., to the full register width where it is to be loaded. The zero extending may include filling the non-used (e.g., empty) bits (e.g., most significant bits) with zeros, e.g., so that the value of the extended data remains the same as the non-extended value. For example, a fusion manager may detect an instruction to perform an arithmetic and/or bitwise logical operation, e.g., utilizing an arithmetic logic unit (ALU) of a processor. In certain embodiments, an (for example, subsequent, e.g., subsequent in program order) instruction may perform an arithmetic and/or bitwise logical operation (e.g., utilizing an arithmetic logic unit (ALU) of a processor) on the zero extended result. This may allow the arithmetic and/or bitwise logical operation to use the full machine (e.g., processor) register width. In one embodiment, a zero extending load instruction includes a field (e.g., opcode or operand) that indicates the size of the value before and/or after extension. In one embodiment, a first type of zero extending load instruction extends to a first (e.g., fixed) size (e.g., to 32 bits). In one embodiment, a second type of zero extending load instruction extends to a second, different (e.g., fixed) size (e.g., to 64 bits).

In one embodiment, a fusion manager may utilize pseudo-code 500 to detect a zero extending load instruction and an instruction that is to read a result of the zero extending load instruction in the translated instruction stream (e.g., an instruction to perform an arithmetic and/or bitwise logical operation), and fuse the zero extending load instruction and the instruction that is to read the result of the zero extending load instruction into a single fused instruction. For example, fusion manager may utilize (e.g., a circuit to implement) first routine 514, second routine 516, and/or third routine 518. Note that the term next writer may refer to the next writer in program order or in the order of execution (e.g., in an out-of-order processor).

Figure 6:
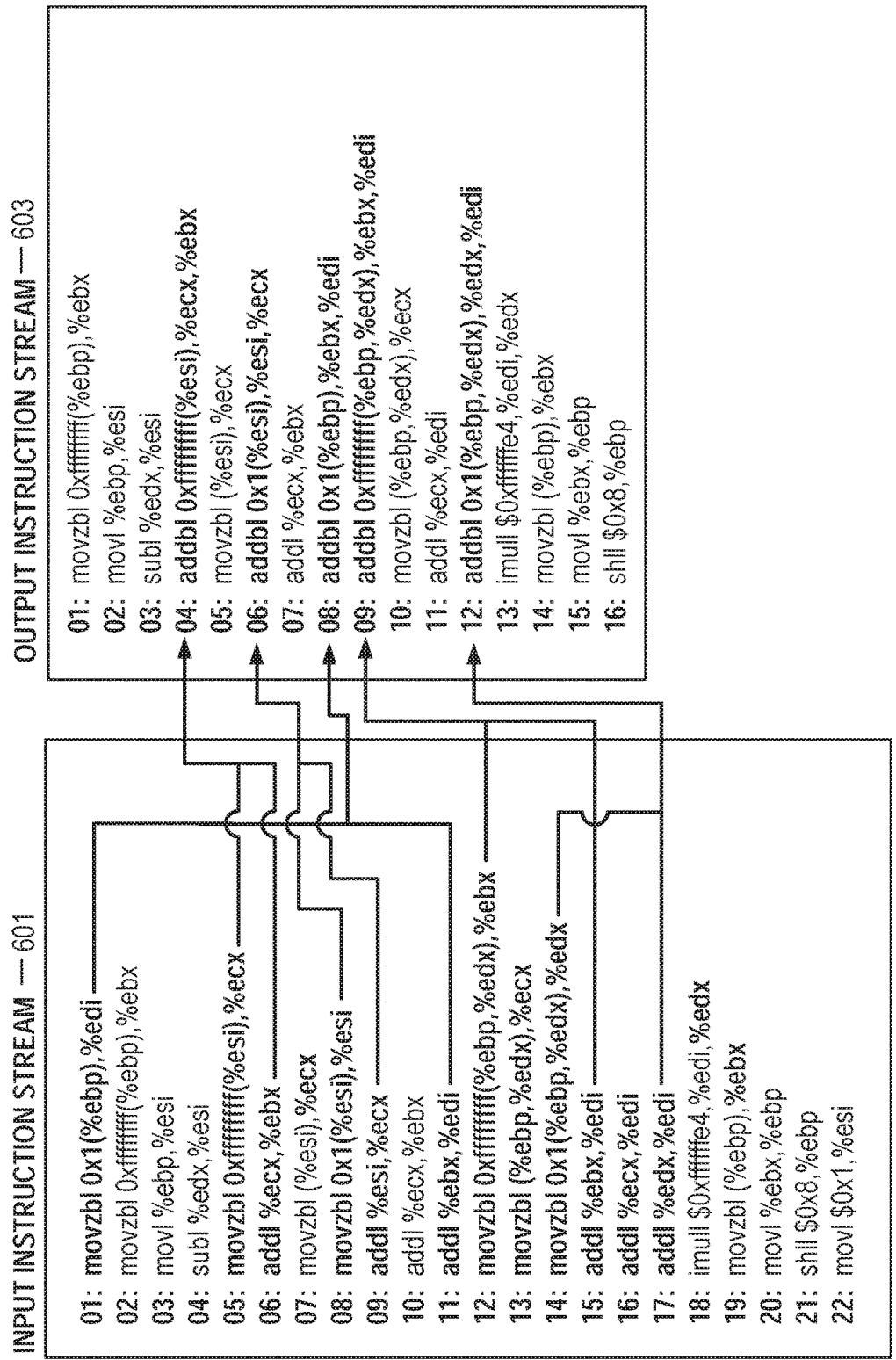
FIG. 6 illustrates an input instruction stream before a fusion operation and an output instruction stream after the fusion operation according to embodiments of the disclosure.
Figure 8:
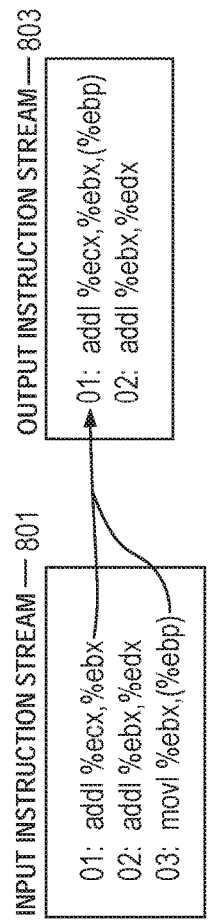
FIG. 8 illustrates an input instruction stream before a fusion operation and an output instruction stream after the fusion operation according to embodiments of the disclosure.

FIG. 6 illustrates an input instruction stream 601 before a fusion operation and an output instruction stream 603 after the fusion operation according to embodiments of the disclosure. In FIGS. 6 and 8, the destination register appears as the rightmost field of each instruction (e.g., after each source field), however other formats may be used (e.g., with the destination register being the leftmost operand field). In FIGS. 6 and 8, the % sign may indicate a register (e.g., and not a modulo operation) and the opened and closed parenthesis (register name) may indicate an indirect mode of addressing, e.g., indirect register addressing where the address to be accessed is stored as the value in the named register. The register names used are examples and other register identifiers may be utilized. In FIGS. 6 and 8, the term between when referring to two instructions may generally refer to between in program order or in the order of execution (e.g., in an in order or out-of-order processor). In one embodiment, a fused instruction includes an additional (e.g., source) field compared to either of the unfused instructions. In certain embodiments, the fused instruction specifies the two sources for the first half of the fused operation and a third source for the second half of the fused operation, for example, the second half of the fused operations obtains its other source (e.g., implicitly) from the result of the first half.

Note that FIG. 6 schematically illustrates five different fusion operations, thus reducing the input instruction stream 601 by 5 instructions relative to the output instruction stream 603 in the depicted embodiment.

Example for Fusing Instructions 01 and 11 in the Input Instruction Stream 601 According to the Pseudocode in FIG. 5

Fusion manager (e.g., routine 514) first may examine instruction 01 in input instruction stream 601 and detect that it is a load, and also a zero extending load. Fusion manager may go to (e.g., function) ALU_search 516 (from I.A.1.a) with I equal to instruction 01 in input instruction stream 601. Therefore at line II thereof, Load_Dest is equal to register % edi. At line III, K becomes instruction 11 in input instruction stream 601 since this is the first instruction after 01 that reads register % edi. In one embodiment, the fusion manager does not continue a fusion operation if it detects a control flow instruction (e.g., branch) therebetween, for example, between 01 and 11 in the input instruction stream 601 in this example. Instruction 11 is in the category of fuseable instructions of fusion manager, so fusion manager continues to line IV.A of routine 516 where the next writer (e.g., that is to overwrite the contents) of register % edi (X) identified is also instruction 11 in the input instruction stream 601. At line IV.C, fusion manager verifies that there are no other readers of % edi other than K between I (instruction 01 in input instruction stream 601) and X (instruction 11 in input instruction stream 601) and thus the fusion manager determines I and K may be fused, e.g., with the fused instruction being instruction 08 in output instruction stream 603. For example, in one embodiment, instruction 11 reads both % edi and % ebx and the other instruction to be fused (instruction 01) reads memory location 0x1 (% ebp) and register % edi. Thus instead of explicitly requiring all four sources in this example, the two sources of the first half (0x1(% ebp) and % edi) are listed explicitly and the result of this operation is supplied implicitly to the second half of the fused operation along with % ebx.

Example for Fusing Instructions 05 and 06 in the Input Instruction Stream 601 According to the Pseudocode in FIG. 5

Fusion manager (e.g., routine 514) first may examine instruction 05 and detect that it is a load, and also a zero extending load. Fusion manager may go to (e.g., function) ALU_search 516 (from I.A.1.a) with I equal to instruction 05 in input instruction stream 601. Therefore at line II thereof, Load_Dest is equal to register % ecx. At line III, K becomes instruction 06 in input instruction stream 601 since this is the first instruction after 05 that reads register % ecx. In one embodiment, the fusion manager does not continue a fusion operation if it detects a control flow instruction (e.g., branch) therebetween, for example, between 05 and 06 in the input instruction stream 601 in this example. Instruction 06 is in the category of fuseable instructions of fusion manager, so fusion manager continues to line IV.A of routine 516 where the next writer (e.g., that is to overwrite the contents) of % ecx (X) identified is instruction 07 in the input instruction stream 601. At line IV.C, fusion manager verifies that there are no readers of register % ecx other than K between I (instruction 05 in the input instruction stream 601) and X (instruction 07 in the input instruction stream 601) and X also does not read % ecx (e.g., it only writes it) and thus the fusion manager determines I and K may be fused, e.g., with the fused instruction being instruction 04 in output instruction stream 603. In one embodiment, two instructions are considered in the category of fuseable instructions when there is a performance benefit to doing so, e.g., where the single, fused instructions will execute to completion faster than (e.g., sequential) execution of the two unfused instructions.

Instructions 08 and 09 of input instruction stream 601 may similarly be fused into single instruction 06 of the output instruction stream 603, e.g., according to the pseudocode in FIG. 5. In the embodiment in FIG. 6, the next writer of register % esi (e.g., esi) after instruction 08 of input instruction stream 601 is instruction 22 in input instruction stream 601.

Instructions 12 and 15 of input instruction stream 601 may similarly be fused into single instruction 09 of the output instruction stream 603, e.g., according to the pseudocode in FIG. 5. In the embodiment in FIG. 6, the next writer of register % ebx (e.g., ebx) after instruction 12 of input instruction stream 601 is instruction 19 in input instruction stream 601.

Instructions 14 and 17 of input instruction stream 601 may similarly be fused into single instruction 12 of the output instruction stream 603, e.g., according to the pseudocode in FIG. 5. In the embodiment in FIG. 6, the next writer of register % edx (e.g., edx) after instruction 12 of input instruction stream 601 is instruction 18 in input instruction stream 601.

Example for not Fusing Instructions 13 and 16 in the Input Instruction Stream 601 According to the Pseudocode in FIG. 5

Fusion manager (e.g., routine 514) first may examine instruction 13 and detect that it is a load, and also a zero extending load. Fusion manager may go to (e.g., function) ALU_search 516 (from I.A.1.a) with I equal to instruction 13 in input instruction stream 601. Therefore at line II thereof, Load_Dest is equal to register % ecx. At line III, K becomes instruction 16 in input instruction stream 601 since this is the first instruction after 13 that reads register % ecx. In one embodiment, the fusion manager does not continue a fusion operation if it detects a control flow instruction (e.g., branch) therebetween, for example, between 13 and 16 in the input instruction stream 601 in this example. Instruction 16 is in the category of fuseable instructions of fusion manager, so fusion manager continues to line IV.A of routine 516, but no next writer (e.g., that is to overwrite the contents) of % ecx (X) is found (e.g., in the input instruction stream). As such, the fusion manager determines that instructions 13 and 16 of the input instruction stream 601 are not fusable in this embodiment, for example, because fusion manager may not detect (e.g., guarantee) some other instruction will not utilize (e.g., read) that value in % ecx.

Figure 7:
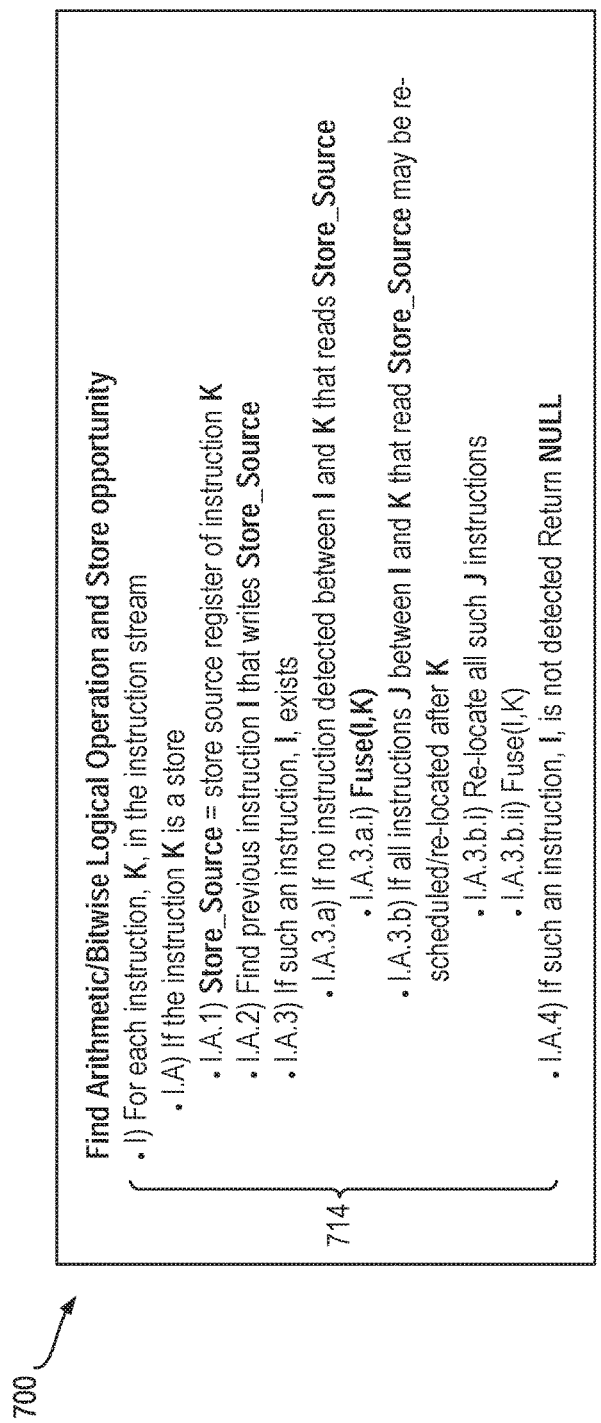
FIG. 7 illustrates pseudocode of a fusion operation according to embodiments of the disclosure.

FIG. 7 illustrates pseudocode 700 of a fusion operation according to embodiments of the disclosure. In one embodiment, part and/or all of section 714 of pseudocode may be a software routine or performed by a hardware circuit (e.g., logic). Pseudocode 700 illustrates one example of pseudocode that a fusion manager may utilize in the detection and/or fusing of instructions (e.g., macro-instructions). In one embodiment, a fusion manager may use pseudocode 700 to detect (e.g., in the instruction stream) an (e.g., macro-instruction) instruction that is to produce a result and a (for example, subsequent, e.g., subsequent in program order) store (e.g., macro-instruction) instruction that is to read the result, and fuse the (e.g., macro-instruction) instruction that is to produce the result and the store (e.g., macro-instruction) instruction that is to read the result into the single fused (e.g., macro-instruction) instruction. For example, a fusion manager may detect an instruction to perform an arithmetic and/or bitwise logical operation, e.g., utilizing an arithmetic logic unit (ALU) of a processor, that is to produce a result. In certain embodiments, an instruction may perform an arithmetic and/or bitwise logical operation (e.g., utilizing an arithmetic logic unit (ALU) of a processor) to produce a result and the result may be used in a (for example, subsequent, e.g., subsequent in program order) store (e.g., move) instruction.

FIG. 8 illustrates an input instruction stream 801 before a fusion operation and an output instruction stream 803 after the fusion operation according to embodiments of the disclosure. FIG. 8 schematically illustrates one fusion operation, thus reducing the input instruction stream 801 by one instruction relative to the output instruction stream 803 in the depicted embodiment.

Example for Fusing Instructions 01 and 03 in the Input Instruction Stream 801 According to the Pseudocode in FIG. 7

Fusion manager (e.g., routine 714) first may examine instruction 03 in input instruction stream 801 and detect that it is a store (K becomes instruction 03 in the input instruction stream 801). At line I.A.1, Store_Source (e.g., the value to be stored into memory) is located in register % ebx. At line I.A.2, I becomes instruction 01 in input instruction stream 801 since that instruction sets the value of Store_Source (e.g., in register % ebx in this example). In one embodiment, the fusion manager does not continue a fusion operation if it detects a control flow instruction (e.g., branch) therebetween, for example, between 01 and 03 in the input instruction stream 801 in this example. Instruction 02 reads Store_Source (% ebx), so the condition at I.A.3.a is false and the fusion manager then performs the additional check described in I.A.3.b. In this example, instruction 02 in the input instruction stream 801 is the only such J instruction and it may be relocated (e.g., rescheduled) to after K (instruction 03 in the input instruction stream 801) in the output instruction stream 803 as the relocating (e.g., rescheduling) will not affect the values read by instructions 02 and/or 03 in the input instruction stream 801. Thus, at line I.A.3.b.i, the fusion manager may fuse instructions 01 and 03 of the input instruction stream 801 into single, fused instruction 01 of the output instruction stream 803, e.g., which effectively moves instruction 02 of the input instruction stream 801 for execution after the operation in instruction 03 of the input instruction stream 801

As another example, the fusion manager would not fuse instructions 01 and 03 of the input instruction stream 801 if an instruction J (e.g., instruction 02 of the input instruction stream 801 in FIG. 8) between instruction I (e.g., instruction 01 of the input instruction stream 801 in FIG. 8) and instruction K (e.g., instruction 03 of the input instruction stream 801 in FIG. 8) was not to be relocated (e.g., rescheduled), for example, if the destination register (e.g., % edx here) of instruction 02 (J) of the input instruction stream 801 was to be read by instruction 03 (K).

Note that although FIG. 8 and FIG. 6 are separate, the fusion operations (e.g., according to pseudocode 500 and pseudocode 700) may occur on the same input instruction stream (e.g., simultaneously).

Certain embodiments herein allow reduced instruction set computing (RISC) binary translator ISA instructions to achieve the brevity and density of complex instruction set computing (CISC) (e.g., x86) macro instructions, for example, utilizing the existing decoding logic of a processor. The density improvement may be achieved via macro-instruction reduction, which also may improve allocate, rename, and/or retire bandwidth. Certain embodiments may include binary translator ISA instructions that support instructions with 3 operands, e.g., two sources and one destination. This may allow certain fusion operations (e.g., an ALU and store fusion) where the memory operand is not a source operand.

In one embodiment, a hardware processor includes a hardware binary translator to translate an instruction stream into a translated instruction stream, a hardware fusion manager to fuse multiple instructions of the translated instruction stream into a single fused instruction, a hardware decode unit to decode the single fused instruction into a decoded, single fused instruction, and a hardware execution unit to execute the decoded, single fused instruction. The hardware fusion manager may detect a zero extending load instruction and an instruction that is to read a result of the zero extending load instruction in the translated instruction stream, and fuse the zero extending load instruction and the instruction that is to read the result of the zero extending load instruction into the single fused instruction. The hardware fusion manager may not fuse the zero extending load instruction and the instruction that is to read the result of the zero extending load instruction into the single fused instruction unless a later instruction that is to overwrite the result of the zero extending load instruction is detected. The hardware fusion manager may not fuse the zero extending load instruction and the instruction that is to read the result of the zero extending load instruction if the hardware fusion manager detects any additional instruction of the translated instruction stream between the zero extending load instruction and a later instruction that is to overwrite and not read the result of the zero extending load instruction, other than the instruction that is to read the result of the zero extending load instruction, that is also to read the result of the zero extending load instruction. The hardware fusion manager may detect, in the translated instruction stream, an instruction that is to produce a result and a store instruction that is to read the result, and fuse the instruction that is to produce the result and the store instruction that is to read the result into the single fused instruction. The hardware fusion manager may not fuse the instruction that is to produce the result and the store instruction that is to read the result if the hardware fusion manager detects any instruction of the translated instruction stream between the instruction that is to produce the result and the store instruction that is to read the result that is also to read the result. The hardware fusion manager may not fuse the instruction that is to produce the result and the store instruction that is to read the result if the hardware fusion manager detects: any instruction of the translated instruction stream that is also to read the result between the instruction that is to produce the result and the store instruction that is to read the result, and/or the single fused instruction is to overwrite the result. The instruction stream may be a stream of macro-instructions.

In another embodiment, a method includes translating an instruction stream into a translated instruction stream with a binary translator, fusing multiple instructions of the translated instruction stream into a single fused instruction with a fusion manager, decoding the single fused instruction into a decoded, single fused instruction with a hardware decode unit of a hardware processor, and executing the decoded, single fused instruction with a hardware execution unit of the hardware processor. The method may include detecting a zero extending load instruction and an instruction that is to read a result of the zero extending load instruction in the translated instruction stream, and fusing the zero extending load instruction and the instruction that is to read the result of the zero extending load instruction into the single fused instruction. The method may include not fusing the zero extending load instruction and the instruction that is to read the result of the zero extending load instruction into the single fused instruction unless a later instruction that is to overwrite the result of the zero extending load instruction is detected. The method may include not fusing the zero extending load instruction and the instruction that is to read the result of the zero extending load instruction if the fusion manager detects any additional instruction of the translated instruction stream between the zero extending load instruction and a later instruction that is to overwrite and not read the result of the zero extending load instruction, other than the instruction that is to read the result of the zero extending load instruction, that is also to read the result of the zero extending load instruction. The method may include detecting, in the translated instruction stream, an instruction that is to produce a result and a store instruction that is to read the result, and fusing the instruction that is to produce the result and the store instruction that is to read the result into the single fused instruction. The method may include not fusing the instruction that is to produce the result and the store instruction that is to read the result if the fusion manager detects any instruction of the translated instruction stream between the instruction that is to produce the result and the store instruction that is to read the result that is also to read the result. The method may include not fusing the instruction that is to produce the result and the store instruction that is to read the result if the fusion manager detects: any instruction of the translated instruction stream that is also to read the result between the instruction that is to produce the result and the store instruction that is to read the result, and/or the single fused instruction is to overwrite the result. The instruction stream may be a stream of macro-instructions.

In yet another embodiment, a non-transitory machine readable medium that stores code that when executed by a machine causes the machine to perform a method including translating an instruction stream into a translated instruction stream with a binary translator, fusing multiple instructions of the translated instruction stream into a single fused instruction with a fusion manager, decoding the single fused instruction into a decoded, single fused instruction, and executing the decoded, single fused instruction. The method may include detecting a zero extending load instruction and an instruction that is to read a result of the zero extending load instruction in the translated instruction stream, and fusing the zero extending load instruction and the instruction that is to read the result of the zero extending load instruction into the single fused instruction. The method may include not fusing the zero extending load instruction and the instruction that is to read the result of the zero extending load instruction into the single fused instruction unless a later instruction that is to overwrite the result of the zero extending load instruction is detected. The method may include not fusing the zero extending load instruction and the instruction that is to read the result of the zero extending load instruction if the fusion manager detects any additional instruction of the translated instruction stream between the zero extending load instruction and a later instruction that is to overwrite and not read the result of the zero extending load instruction, other than the instruction that is to read the result of the zero extending load instruction, that is also to read the result of the zero extending load instruction. The method may include detecting, in the translated instruction stream, an instruction that is to produce a result and a store instruction that is to read the result, and fusing the instruction that is to produce the result and the store instruction that is to read the result into the single fused instruction. The method may include not fusing the instruction that is to produce the result and the store instruction that is to read the result if the fusion manager detects any instruction of the translated instruction stream between the instruction that is to produce the result and the store instruction that is to read the result that is also to read the result. The method may include not fusing the instruction that is to produce the result and the store instruction that is to read the result if the fusion manager detects: any instruction of the translated instruction stream that is also to read the result between the instruction that is to produce the result and the store instruction that is to read the result, and/or the single fused instruction is to overwrite the result. The instruction stream may be a stream of macro-instructions.

In another embodiment, an apparatus includes means to translate an instruction stream into a translated instruction stream with a binary translator, means to fuse multiple instructions of the translated instruction stream into a single fused instruction with a fusion manager, means to decode the single fused instruction into a decoded, single fused instruction, and/or means to execute the decoded, single fused instruction.

In yet another embodiment, an apparatus comprises a data storage device that stores code that when executed by a hardware processor causes the hardware processor to perform any method disclosed herein. An apparatus may be as described in the detailed description. A method may be as described in the detailed description.

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, September 2015; and see Intel® Architecture Instruction Set Extensions Programming Reference, August 2015).

Exemplary Instruction Formats

Embodiments of the instruction(s) described herein may be embodied in different formats. Additionally, exemplary systems, architectures, and pipelines are detailed below.

Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 9A:
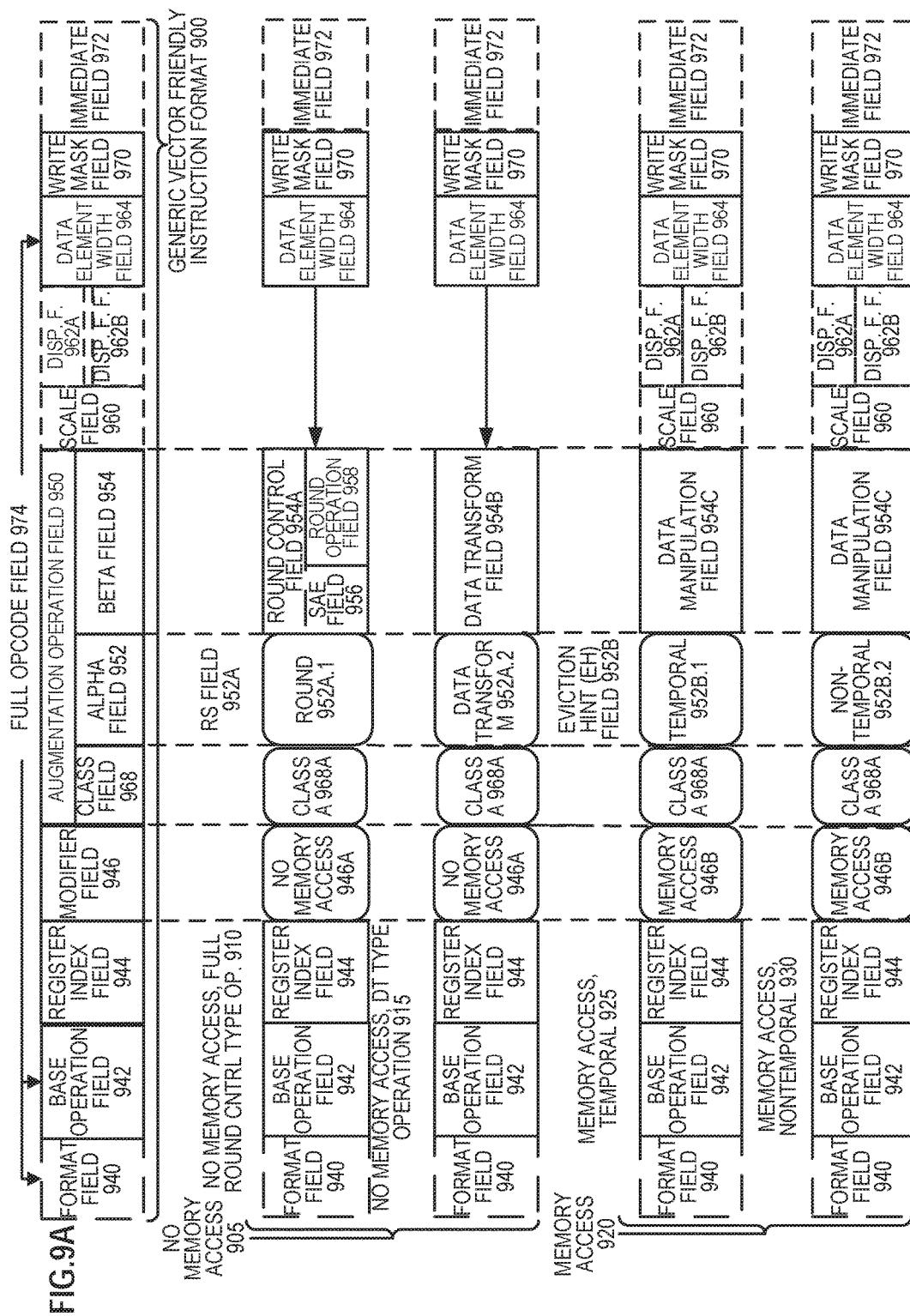
FIG. 9A is a block diagram illustrating a generic vector friendly instruction format and class A instruction templates thereof according to embodiments of the disclosure.
Figure 9B:
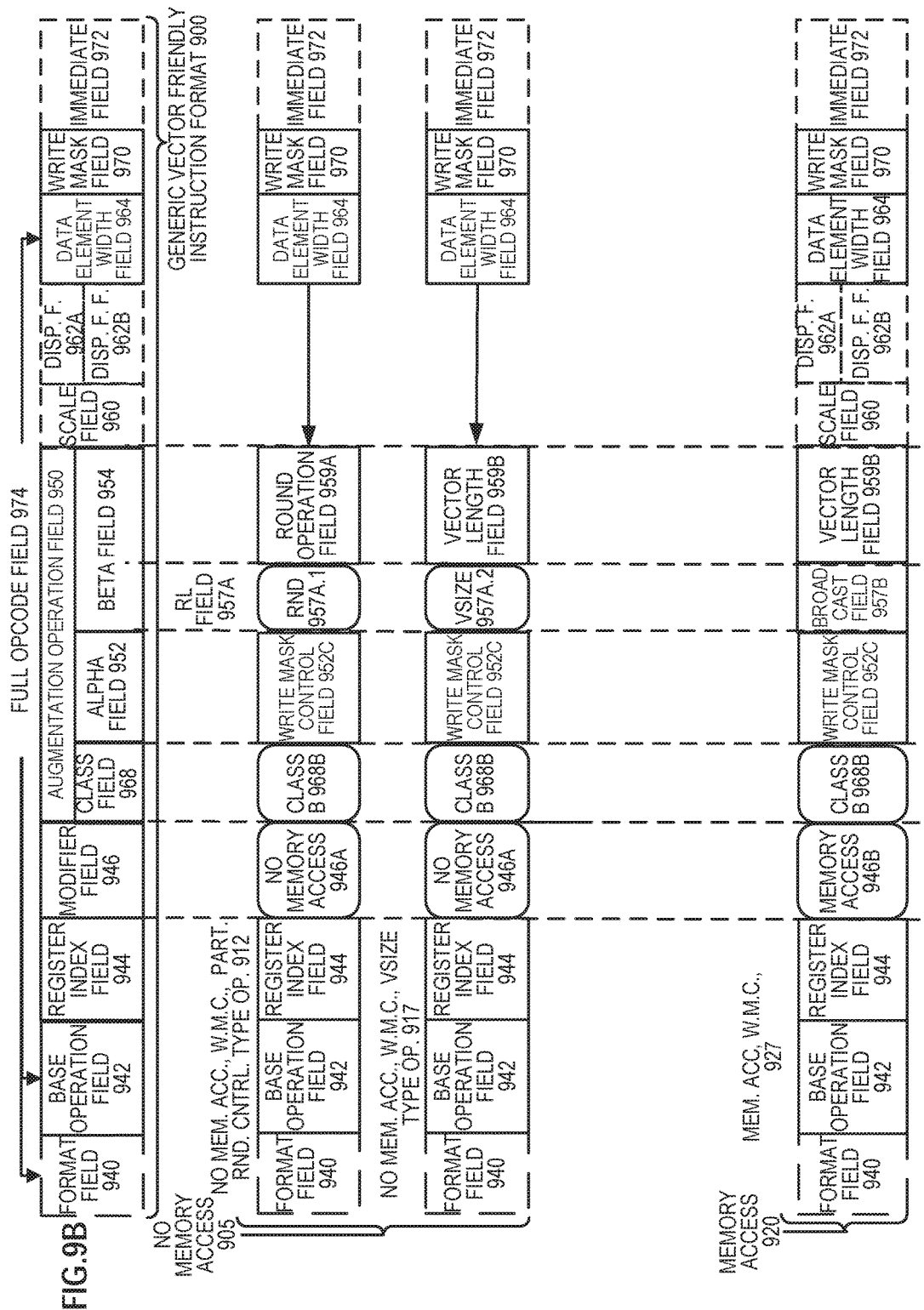
FIG. 9B is a block diagram illustrating the generic vector friendly instruction format and class B instruction templates thereof according to embodiments of the disclosure.

FIGS. 9A-9B are block diagrams illustrating a generic vector friendly instruction format and instruction templates thereof according to embodiments of the disclosure. FIG. 9A is a block diagram illustrating a generic vector friendly instruction format and class A instruction templates thereof according to embodiments of the disclosure; while FIG. 9B is a block diagram illustrating the generic vector friendly instruction format and class B instruction templates thereof according to embodiments of the disclosure. Specifically, a generic vector friendly instruction format 900 for which are defined class A and class B instruction templates, both of which include no memory access 905 instruction templates and memory access 920 instruction templates. The term generic in the context of the vector friendly instruction format refers to the instruction format not being tied to any specific instruction set.

While embodiments of the disclosure will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 9A include: 1) within the no memory access 905 instruction templates there is shown a no memory access, full round control type operation 910 instruction template and a no memory access, data transform type operation 915 instruction template; and 2) within the memory access 920 instruction templates there is shown a memory access, temporal 925 instruction template and a memory access, non-temporal 930 instruction template. The class B instruction templates in FIG. 9B include: 1) within the no memory access 905 instruction templates there is shown a no memory access, write mask control, partial round control type operation 912 instruction template and a no memory access, write mask control, vsize type operation 917 instruction template; and 2) within the memory access 920 instruction templates there is shown a memory access, write mask control 927 instruction template.

The generic vector friendly instruction format 900 includes the following fields listed below in the order illustrated in FIGS. 9A-9B.

Format field 940—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 942—its content distinguishes different base operations.

Register index field 944—its content, directly or through address generation, specifies the locations of the source and destination operands, be they in registers or in memory. These include a sufficient number of bits to select N registers from a PxQ (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 946—its content distinguishes occurrences of instructions in the generic vector instruction format that specify memory access from those that do not; that is, between no memory access 905 instruction templates and memory access 920 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 950—its content distinguishes which one of a variety of different operations to be performed in addition to the base operation. This field is context specific. In one embodiment of the disclosure, this field is divided into a class field 968, an alpha field 952, and a beta field 954. The augmentation operation field 950 allows common groups of operations to be performed in a single instruction rather than 2, 3, or 4 instructions.

Scale field 960—its content allows for the scaling of the index field's content for memory address generation (e.g., for address generation that uses $2^{scale}*\text{index}+\text{base}$).

Displacement Field 962A—its content is used as part of memory address generation (e.g., for address generation that uses $2^{scale}*\text{index}+\text{base}+\text{displacement}$).

Displacement Factor Field 962B (note that the juxtaposition of displacement field 962A directly over displacement factor field 962B indicates one or the other is used)—its content is used as part of address generation; it specifies a displacement factor that is to be scaled by the size of a memory access (N)—where N is the number of bytes in the memory access (e.g., for address generation that uses $2^{scale}*\text{index}+\text{base}+\text{scaled displacement}$). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 974 (described later herein) and the data manipulation field 954C. The displacement field 962A and the displacement factor field 962B are optional in the sense that they are not used for the no memory access 905 instruction templates and/or different embodiments may implement only one or none of the two.

Data element width field 964—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 970—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 970 allows for partial vector operations, including loads, stores, arithmetic, logical, etc. While embodiments of the disclosure are described in which the write mask field's 970 content selects one of a number of write mask registers that contains the write mask to be used (and thus the write mask field's 970 content indirectly identifies that masking to be performed), alternative embodiments instead or additional allow the mask write field's 970 content to directly specify the masking to be performed.

Immediate field 972—its content allows for the specification of an immediate. This field is optional in the sense that is it not present in an implementation of the generic vector friendly format that does not support immediate and it is not present in instructions that do not use an immediate.

Class field 968—its content distinguishes between different classes of instructions. With reference to FIGS. 9A-B, the contents of this field select between class A and class B instructions. In FIGS. 9A-B, rounded corner squares are used to indicate a specific value is present in a field (e.g., class A 968A and class B 968B for the class field 968 respectively in FIGS. 9A-B).

Instruction Templates of Class A

In the case of the non-memory access 905 instruction templates of class A, the alpha field 952 is interpreted as an RS field 952A, whose content distinguishes which one of the different augmentation operation types are to be performed (e.g., round 952A.1 and data transform 952A.2 are respectively specified for the no memory access, round type operation 910 and the no memory access, data transform type operation 915 instruction templates), while the beta field 954 distinguishes which of the operations of the specified type is to be performed. In the no memory access 905 instruction templates, the scale field 960, the displacement field 962A, and the displacement scale filed 962B are not present.

No-Memory Access Instruction Templates—Full Round Control Type Operation

In the no memory access full round control type operation 910 instruction template, the beta field 954 is interpreted as a round control field 954A, whose content(s) provide static rounding. While in the described embodiments of the disclosure the round control field 954A includes a suppress all floating point exceptions (SAE) field 956 and a round operation control field 958, alternative embodiments may support may encode both these concepts into the same field or only have one or the other of these concepts/fields (e.g., may have only the round operation control field 958).

SAE field 956—its content distinguishes whether or not to disable the exception event reporting; when the SAE field's 956 content indicates suppression is enabled, a given instruction does not report any kind of floating-point exception flag and does not raise any floating point exception handler.

Round operation control field 958—its content distinguishes which one of a group of rounding operations to perform (e.g., Round-up, Round-down, Round-towards-zero and Round-to-nearest). Thus, the round operation control field 958 allows for the changing of the rounding mode on a per instruction basis. In one embodiment of the disclosure where a processor includes a control register for specifying rounding modes, the round operation control field's 950 content overrides that register value.

No Memory Access Instruction Templates—Data Transform Type Operation

In the no memory access data transform type operation 915 instruction template, the beta field 954 is interpreted as a data transform field 954B, whose content distinguishes which one of a number of data transforms is to be performed (e.g., no data transform, swizzle, broadcast).

In the case of a memory access 920 instruction template of class A, the alpha field 952 is interpreted as an eviction hint field 952B, whose content distinguishes which one of the eviction hints is to be used (in FIG. 9A, temporal 952B.1 and non-temporal 952B.2 are respectively specified for the memory access, temporal 925 instruction template and the memory access, non-temporal 930 instruction template), while the beta field 954 is interpreted as a data manipulation field 954C, whose content distinguishes which one of a number of data manipulation operations (also known as primitives) is to be performed (e.g., no manipulation; broadcast; up conversion of a source; and down conversion of a destination). The memory access 920 instruction templates include the scale field 960, and optionally the displacement field 962A or the displacement scale field 962B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 952 is interpreted as a write mask control (Z) field 952C, whose content distinguishes whether the write masking controlled by the write mask field 970 should be a merging or a zeroing.

In the case of the non-memory access 905 instruction templates of class B, part of the beta field 954 is interpreted as an RL field 957A, whose content distinguishes which one of the different augmentation operation types are to be performed (e.g., round 957A.1 and vector length (VSIZE) 957A.2 are respectively specified for the no memory access, write mask control, partial round control type operation 912 instruction template and the no memory access, write mask control, VSIZE type operation 917 instruction template), while the rest of the beta field 954 distinguishes which of the operations of the specified type is to be performed. In the no memory access 905 instruction templates, the scale field 960, the displacement field 962A, and the displacement scale filed 962B are not present.

In the no memory access, write mask control, partial round control type operation 910 instruction template, the rest of the beta field 954 is interpreted as a round operation field 959A and exception event reporting is disabled (a given instruction does not report any kind of floating-point exception flag and does not raise any floating point exception handler).

Round operation control field 959A—just as round operation control field 958, its content distinguishes which one of a group of rounding operations to perform (e.g., Round-up, Round-down, Round-towards-zero and Round-to-nearest). Thus, the round operation control field 959A allows for the changing of the rounding mode on a per instruction basis. In one embodiment of the disclosure where a processor includes a control register for specifying rounding modes, the round operation control field's 950 content overrides that register value.

In the no memory access, write mask control, VSIZE type operation 917 instruction template, the rest of the beta field 954 is interpreted as a vector length field 959B, whose content distinguishes which one of a number of data vector lengths is to be performed on (e.g., 128, 256, or 512 byte).

In the case of a memory access 920 instruction template of class B, part of the beta field 954 is interpreted as a broadcast field 957B, whose content distinguishes whether or not the broadcast type data manipulation operation is to be performed, while the rest of the beta field 954 is interpreted the vector length field 959B. The memory access 920 instruction templates include the scale field 960, and optionally the displacement field 962A or the displacement scale field 962B.

With regard to the generic vector friendly instruction format 900, a full opcode field 974 is shown including the format field 940, the base operation field 942, and the data element width field 964. While one embodiment is shown where the full opcode field 974 includes all of these fields, the full opcode field 974 includes less than all of these fields in embodiments that do not support all of them. The full opcode field 974 provides the operation code (opcode).

The augmentation operation field 950, the data element width field 964, and the write mask field 970 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the disclosure, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the disclosure). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the disclosure. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

FIG. 10 is a block diagram illustrating an exemplary specific vector friendly instruction format according to embodiments of the disclosure. FIG. 10 shows a specific vector friendly instruction format 1000 that is specific in the sense that it specifies the location, size, interpretation, and order of the fields, as well as values for some of those fields. The specific vector friendly instruction format 1000 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 9 into which the fields from FIG. 10 map are illustrated.

It should be understood that, although embodiments of the disclosure are described with reference to the specific vector friendly instruction format 1000 in the context of the generic vector friendly instruction format 900 for illustrative purposes, the disclosure is not limited to the specific vector friendly instruction format 1000 except where claimed. For example, the generic vector friendly instruction format 900 contemplates a variety of possible sizes for the various fields, while the specific vector friendly instruction format 1000 is shown as having fields of specific sizes. By way of specific example, while the data element width field 964 is illustrated as a one bit field in the specific vector friendly instruction format 1000, the disclosure is not so limited (that is, the generic vector friendly instruction format 900 contemplates other sizes of the data element width field 964).

The generic vector friendly instruction format 900 includes the following fields listed below in the order illustrated in FIG. 10A.

EVEX Prefix (Bytes 0-3) 1002—is encoded in a four-byte form.

Format Field 940 (EVEX Byte 0, bits [7:0])—the first byte (EVEX Byte 0) is the format field 940 and it contains 0x62 (the unique value used for distinguishing the vector friendly instruction format in one embodiment of the disclosure).

The second-fourth bytes (EVEX Bytes 1-3) include a number of bit fields providing specific capability.

REX field 1005 (EVEX Byte 1, bits [7-5])—consists of a EVEX.R bit field (EVEX Byte 1, bit [7]—R), EVEX.X bit field (EVEX byte 1, bit [6]—X), and 957BEX byte 1, bit[5]—B). The EVEX.R, EVEX.X, and EVEX.B bit fields provide the same functionality as the corresponding VEX bit fields, and are encoded using is complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 910—this is the first part of the REX' field 910—and is the EVEX.R' bit field (EVEX Byte 1, bit [4]—R') that is used to encode either the upper 16 or lower 16 of the extended 32 register set. In one embodiment of the disclosure, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments of the disclosure do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 1015 (EVEX byte 1, bits [3:0]—mmmm)—its content encodes an implied leading opcode byte (0F, 0F 38, or 0F 3).

Data element width field 964 (EVEX byte 2, bit [7]—W)—is represented by the notation EVEX.W. EVEX.W is used to define the granularity (size) of the datatype (either 32-bit data elements or 64-bit data elements).

EVEX.vvvv 1020 (EVEX Byte 2, bits [6:3]—vvvv)—the role of EVEX.vvvv may include the following: 1) EVEX.vvvv encodes the first source register operand, specified in inverted (1s complement) form and is valid for instructions with 2 or more source operands; 2) EVEX.vvvv encodes the destination register operand, specified in 1s complement form for certain vector shifts; or 3) EVEX.vvvv does not encode any operand, the field is reserved and should contain 1111b. Thus, EVEX.vvvv field 1020 encodes the 4 low-order bits of the first source register specifier stored in inverted (1s complement) form. Depending on the instruction, an extra different EVEX bit field is used to extend the specifier size to 32 registers.

EVEX.U 968 Class field (EVEX byte 2, bit [2]—U)—If EVEX.U=0, it indicates class A or EVEX.U0; if EVEX.U=1, it indicates class B or EVEX.U1.

Prefix encoding field 1025 (EVEX byte 2, bits [1:0]—pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 952 (EVEX byte 3, bit [7]—EH; also known as EVEX.EH, EVEX.rs, EVEX.RL, EVEX.write mask control, and EVEX.N; also illustrated with α)—as previously described, this field is context specific.

Beta field 954 (EVEX byte 3, bits [6:4]—SSS, also known as EVEX.$s_{2-0}$, EVEX.$r_{2-0}$, EVEX.rr1, EVEX.LL0, EVEX.LLB; also illustrated with βββ)—as previously described, this field is context specific.

REX' field 910—this is the remainder of the REX' field and is the EVEX.V' bit field (EVEX Byte 3, bit [3]—V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 970 (EVEX byte 3, bits [2:0]—kkk)—its content specifies the index of a register in the write mask registers as previously described. In one embodiment of the disclosure, the specific value EVEX kkk=000 has a special behavior implying no write mask is used for the particular instruction (this may be implemented in a variety of ways including the use of a write mask hardwired to all ones or hardware that bypasses the masking hardware).

Real Opcode Field 1030 (Byte 4) is also known as the opcode byte. Part of the opcode is specified in this field.

MOD R/M Field 1040 (Byte 5) includes MOD field 1042, Reg field 1044, and R/M field 1046. As previously described, the MOD field's 1042 content distinguishes between memory access and non-memory access operations. The role of Reg field 1044 can be summarized to two situations: encoding either the destination register operand or a source register operand, or be treated as an opcode extension and not used to encode any instruction operand. The role of R/M field 1046 may include the following: encoding the instruction operand that references a memory address, or encoding either the destination register operand or a source register operand.

Scale, Index, Base (SIB) Byte (Byte 6)—As previously described, the scale field's 950 content is used for memory address generation. SIB.xxx 1054 and SIB.bbb 1056—the contents of these fields have been previously referred to with regard to the register indexes Xxxx and Bbbb.

Displacement field 962A (Bytes 7-10)—when MOD field 1042 contains 10, bytes 7-10 are the displacement field 962A, and it works the same as the legacy 32-bit displacement (disp32) and works at byte granularity.

Displacement factor field 962B (Byte 7)—when MOD field 1042 contains 01, byte 7 is the displacement factor field 962B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 962B is a reinterpretation of disp8; when using displacement factor field 962B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 962B substitutes the legacy x86 instruction set 8-bit displacement. Thus, the displacement factor field 962B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset). Immediate field 972 operates as previously described.

Full Opcode Field

FIG. 10B is a block diagram illustrating the fields of the specific vector friendly instruction format 1000 that make up the full opcode field 974 according to one embodiment of the disclosure. Specifically, the full opcode field 974 includes the format field 940, the base operation field 942, and the data element width (W) field 964. The base operation field 942 includes the prefix encoding field 1025, the opcode map field 1015, and the real opcode field 1030.

Register Index Field

FIG. 10C is a block diagram illustrating the fields of the specific vector friendly instruction format 1000 that make up the register index field 944 according to one embodiment of the disclosure. Specifically, the register index field 944 includes the REX field 1005, the REX' field 1010, the MODR/M.reg field 1044, the MODR/M.r/m field 1046, the VVVV field 1020, xxx field 1054, and the bbb field 1056.

Augmentation Operation Field

Figure 10D:
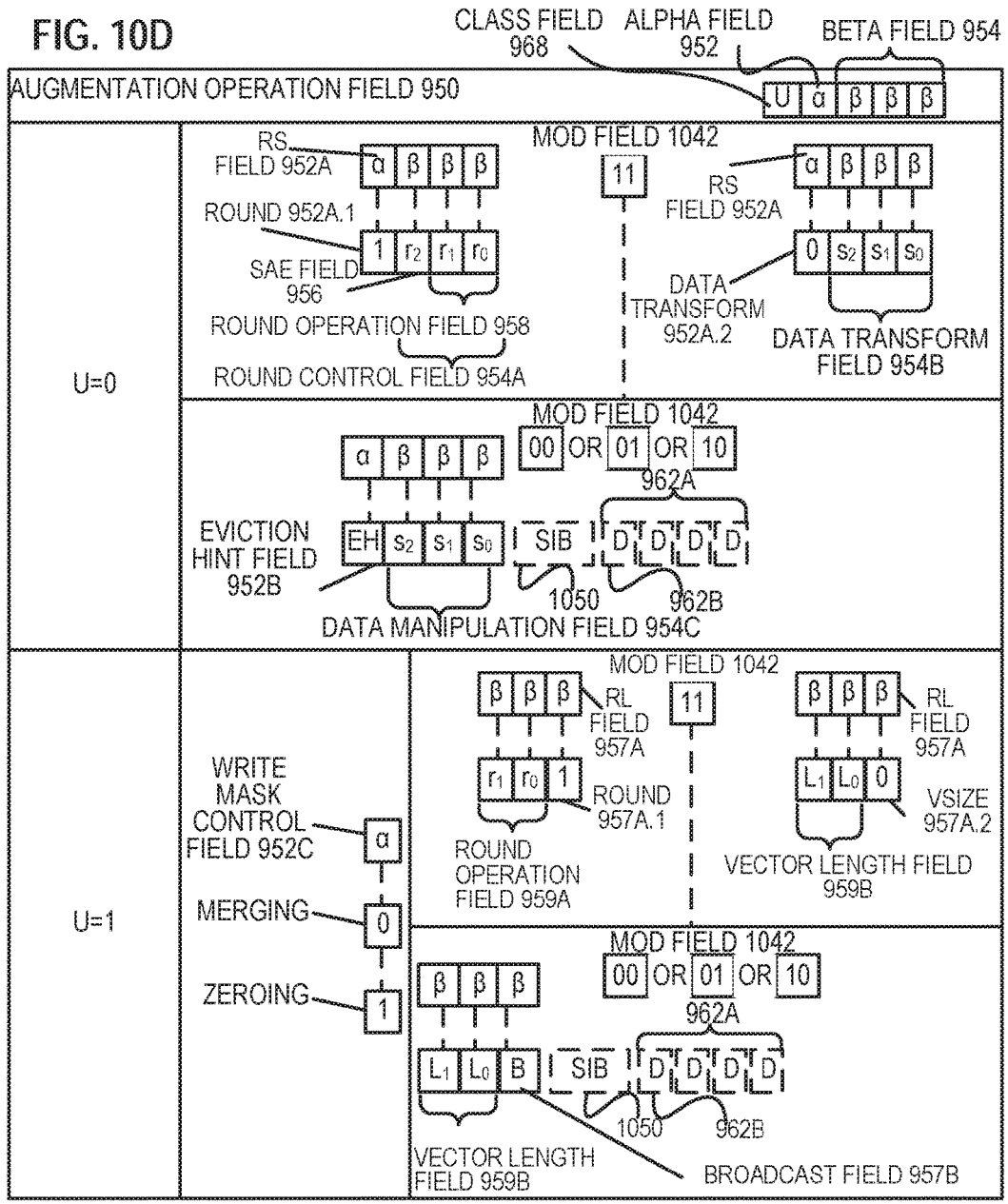
FIG. 10D is a block diagram illustrating the fields of the specific vector friendly instruction format in FIG. 10A that make up the augmentation operation field 950 according to one embodiment of the disclosure.

FIG. 10D is a block diagram illustrating the fields of the specific vector friendly instruction format 1000 that make up the augmentation operation field 950 according to one embodiment of the disclosure. When the class (U) field 968 contains 0, it signifies EVEX.U0 (class A 968A); when it contains 1, it signifies EVEX.U1 (class B 968B). When U=0 and the MOD field 1042 contains 11 (signifying a no memory access operation), the alpha field 952 (EVEX byte 3, bit [7]—EH) is interpreted as the rs field 952A. When the rs field 952A contains a 1 (round 952A.1), the beta field 954 (EVEX byte 3, bits [6:4]—SSS) is interpreted as the round control field 954A. The round control field 954A includes a one bit SAE field 956 and a two bit round operation field 958. When the rs field 952A contains a 0 (data transform 952A.2), the beta field 954 (EVEX byte 3, bits [6:4]—SSS) is interpreted as a three bit data transform field 954B. When U=0 and the MOD field 1042 contains 00, 01, or 10 (signifying a memory access operation), the alpha field 952 (EVEX byte 3, bit [7]—EH) is interpreted as the eviction hint (EH) field 952B and the beta field 954 (EVEX byte 3, bits [6:4]—SSS) is interpreted as a three bit data manipulation field 954C.

When U=1, the alpha field 952 (EVEX byte 3, bit [7]—EH) is interpreted as the write mask control (Z) field 952C. When U=1 and the MOD field 1042 contains 11 (signifying a no memory access operation), part of the beta field 954 (EVEX byte 3, bit [4]—$S_0$) is interpreted as the RL field 957A; when it contains a 1 (round 957A.1) the rest of the beta field 954 (EVEX byte 3, bit [6-5]—$S_{2-1}$) is interpreted as the round operation field 959A, while when the RL field 957A contains a 0 (VSIZE 957.A2) the rest of the beta field 954 (EVEX byte 3, bit [6-5]—$S_{2-1}$) is interpreted as the vector length field 959B (EVEX byte 3, bit [6-5]—$L_{1-0}$). When U=1 and the MOD field 1042 contains 00, 01, or 10 (signifying a memory access operation), the beta field 954 (EVEX byte 3, bits [6:4]—SSS) is interpreted as the vector length field 959B (EVEX byte 3, bit [6-5]—$L_{1-0}$) and the broadcast field 957B (EVEX byte 3, bit [4]—B).

Exemplary Register Architecture

Figure 11:
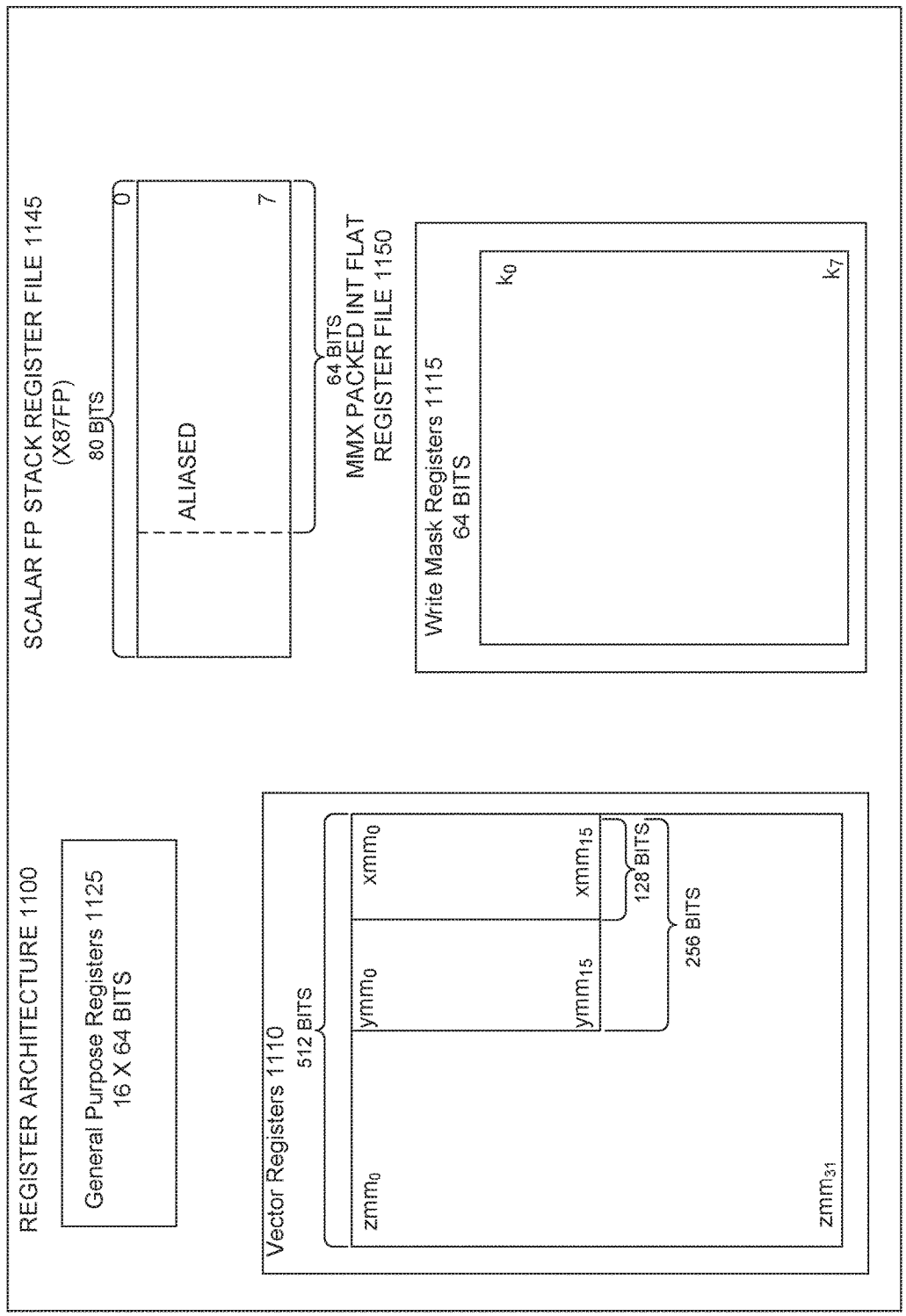
FIG. 11 is a block diagram of a register architecture according to one embodiment of the disclosure

FIG. 11 is a block diagram of a register architecture 1100 according to one embodiment of the disclosure. In the embodiment illustrated, there are 32 vector registers 1110 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 1000 operates on these overlaid register file as illustrated in the below tables.

| Adjustable Vector Length | Class | Operations | Registers |
|---|---|---|---|
| Instruction Templates that do not include the vector length field 959B | A (FIG. 9A; U = 0) | 910, 915, 925, 930 | zmm registers (the vector length is 64 byte) |
|  | B (FIG. 9B; U = 1) | 912 | zmm registers (the vector length is 64 byte) |
| Instruction templates that do include the vector length field 959B | B (FIG. 9B; U = 1) | 917, 927 | zmm, ymm, or xmm registers (the vector length is 64 byte, 32 byte, or 16 byte) depending on the vector length field 959B |

In other words, the vector length field 959B selects between a maximum length and one or more other shorter lengths, where each such shorter length is half the length of the preceding length; and instructions templates without the vector length field 959B operate on the maximum vector length. Further, in one embodiment, the class B instruction templates of the specific vector friendly instruction format 1000 operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 1115—in the embodiment illustrated, there are 8 write mask registers (k0 through k7), each 64 bits in size. In an alternate embodiment, the write mask registers 1115 are 16 bits in size. As previously described, in one embodiment of the disclosure, the vector mask register k0 cannot be used as a write mask; when the encoding that would normally indicate k0 is used for a write mask, it selects a hardwired write mask of 0xFFFF, effectively disabling write masking for that instruction.

General-purpose registers 1125—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 1145, on which is aliased the MMX packed integer flat register file 1150—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the disclosure may use wider or narrower registers. Additionally, alternative embodiments of the disclosure may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 12A is a block diagram illustrating both an exemplary in-order pipeline and an exemplary register renaming, out-of-order issue/execution pipeline according to embodiments of the disclosure. FIG. 12B is a block diagram illustrating both an exemplary embodiment of an in-order architecture core and an exemplary register renaming, out-of-order issue/execution architecture core to be included in a processor according to embodiments of the disclosure. The solid lined boxes in FIGS. 12A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 12A, a processor pipeline 1200 includes a fetch stage 1202, a length decode stage 1204, a decode stage 1206, an allocation stage 1208, a renaming stage 1210, a scheduling (also known as a dispatch or issue) stage 1212, a register read/memory read stage 1214, an execute stage 1216, a write back/memory write stage 1218, an exception handling stage 1222, and a commit stage 1224.

FIG. 12B shows processor core 1290 including a front end unit 1230 coupled to an execution engine unit 1250, and both are coupled to a memory unit 1270. The core 1290 may be a reduced instruction set computing (RISC) core, a complex instruction set computing (CISC) core, a very long instruction word (VLIW) core, or a hybrid or alternative core type. As yet another option, the core 1290 may be a special-purpose core, such as, for example, a network or communication core, compression engine, coprocessor core, general purpose computing graphics processing unit (GPGPU) core, graphics core, or the like.

The front end unit 1230 includes a branch prediction unit 1232 coupled to an instruction cache unit 1234, which is coupled to an instruction translation lookaside buffer (TLB) 1236, which is coupled to an instruction fetch unit 1238, which is coupled to a decode unit 1240. The decode unit 1240 (or decoder or decoder unit) may decode instructions (e.g., macro-instructions), and generate as an output one or more micro-operations, micro-code entry points, micro-instructions, other instructions, or other control signals, which are decoded from, or which otherwise reflect, or are derived from, the original instructions. The decode unit 1240 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1290 includes a microcode ROM or other medium that stores microcode for certain macro-instructions (e.g., in decode unit 1240 or otherwise within the front end unit 1230). The decode unit 1240 is coupled to a rename/allocator unit 1252 in the execution engine unit 1250.

The execution engine unit 1250 includes the rename/allocator unit 1252 coupled to a retirement unit 1254 and a set of one or more scheduler unit(s) 1256. The scheduler unit(s) 1256 represents any number of different schedulers, including reservations stations, central instruction window, etc. The scheduler unit(s) 1256 is coupled to the physical register file(s) unit(s) 1258. Each of the physical register file(s) units 1258 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1258 comprises a vector registers unit, a write mask registers unit, and a scalar registers unit. These register units may provide architectural vector registers, vector mask registers, and general purpose registers. The physical register file(s) unit(s) 1258 is overlapped by the retirement unit 1254 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1254 and the physical register file(s) unit(s) 1258 are coupled to the execution cluster(s) 1260. The execution cluster(s) 1260 includes a set of one or more execution units 1262 and a set of one or more memory access units 1264. The execution units 1262 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1256, physical register file(s) unit(s) 1258, and execution cluster(s) 1260 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1264). It should also be understood that where separate pipelines are used, one or more of these pipelines may be out-of-order issue/execution and the rest in-order.

The set of memory access units 1264 is coupled to the memory unit 1270, which includes a data TLB unit 1272 coupled to a data cache unit 1274 coupled to a level 2 (L2) cache unit 1276. In one exemplary embodiment, the memory access units 1264 may include a load unit, a store address unit, and a store data unit, each of which is coupled to the data TLB unit 1272 in the memory unit 1270. The instruction cache unit 1234 is further coupled to a level 2 (L2) cache unit 1276 in the memory unit 1270. The L2 cache unit 1276 is coupled to one or more other levels of cache and eventually to a main memory.

By way of example, the exemplary register renaming, out-of-order issue/execution core architecture may implement the pipeline 1200 as follows: 1) the instruction fetch 1238 performs the fetch and length decoding stages 1202 and 1204; 2) the decode unit 1240 performs the decode stage 1206; 3) the rename/allocator unit 1252 performs the allocation stage 1208 and renaming stage 1210; 4) the scheduler unit(s) 1256 performs the schedule stage 1212; 5) the physical register file(s) unit(s) 1258 and the memory unit 1270 perform the register read/memory read stage 1214; the execution cluster 1260 perform the execute stage 1216; 6) the memory unit 1270 and the physical register file(s) unit(s) 1258 perform the write back/memory write stage 1218; 7) various units may be involved in the exception handling stage 1222; and 8) the retirement unit 1254 and the physical register file(s) unit(s) 1258 perform the commit stage 1224.

The core 1290 may support one or more instructions sets (e.g., the x86 instruction set (with some extensions that have been added with newer versions); the MIPS instruction set of MIPS Technologies of Sunnyvale, Caif.; the ARM instruction set (with optional additional extensions such as NEON) of ARM Holdings of Sunnyvale, Calif.), including the instruction(s) described herein. In one embodiment, the core 1290 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1234/1274 and a shared L2 cache unit 1276, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 13B:
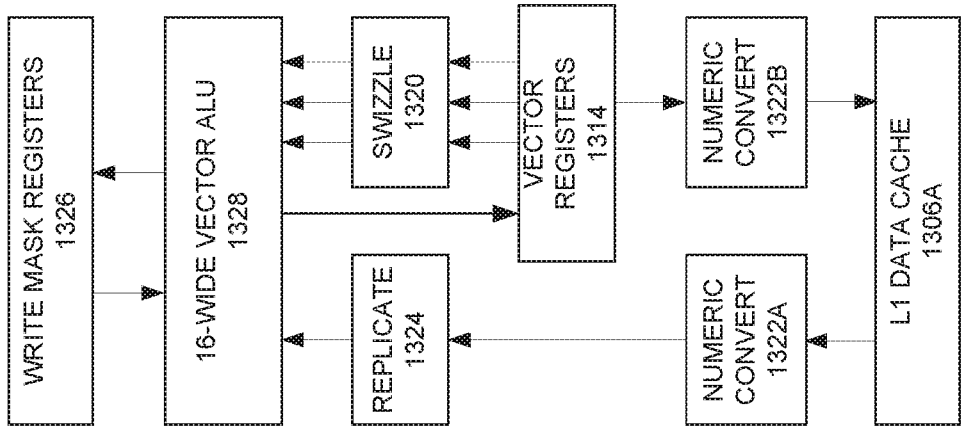
FIG. 13B is an expanded view of part of the processor core in FIG. 13A according to embodiments of the disclosure.
Figure 13A:
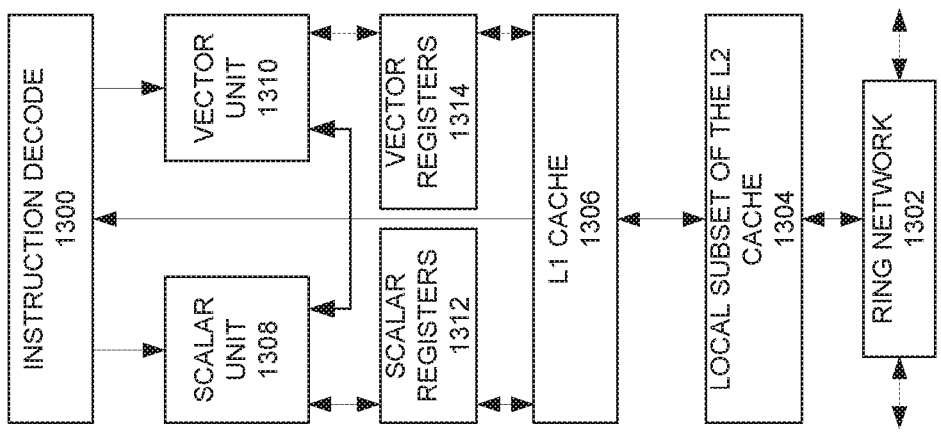
FIG. 13A is a block diagram of a single processor core, along with its connection to the on-die interconnect network and with its local subset of the Level 2 (L2) cache, according to embodiments of the disclosure.

FIGS. 13A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 13A is a block diagram of a single processor core, along with its connection to the on-die interconnect network 1302 and with its local subset of the Level 2 (L2) cache 1304, according to embodiments of the disclosure. In one embodiment, an instruction decode unit 1300 supports the x86 instruction set with a packed data instruction set extension. An L1 cache 1306 allows low-latency accesses to cache memory into the scalar and vector units. While in one embodiment (to simplify the design), a scalar unit 1308 and a vector unit 1310 use separate register sets (respectively, scalar registers 1312 and vector registers 1314) and data transferred between them is written to memory and then read back in from a level 1 (L1) cache 1306, alternative embodiments of the disclosure may use a different approach (e.g., use a single register set or include a communication path that allow data to be transferred between the two register files without being written and read back).

The local subset of the L2 cache 1304 is part of a global L2 cache that is divided into separate local subsets, one per processor core. Each processor core has a direct access path to its own local subset of the L2 cache 1304. Data read by a processor core is stored in its L2 cache subset 1304 and can be accessed quickly, in parallel with other processor cores accessing their own local L2 cache subsets. Data written by a processor core is stored in its own L2 cache subset 1304 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 13B is an expanded view of part of the processor core in FIG. 13A according to embodiments of the disclosure. FIG. 13B includes an L1 data cache 1306A part of the L1 cache 1304, as well as more detail regarding the vector unit 1310 and the vector registers 1314. Specifically, the vector unit 1310 is a 16-wide vector processing unit (VPU) (see the 16-wide ALU 1328), which executes one or more of integer, single-precision float, and double-precision float instructions. The VPU supports swizzling the register inputs with swizzle unit 1320, numeric conversion with numeric convert units 1322A-B, and replication with replication unit 1324 on the memory input. Write mask registers 1326 allow predicating resulting vector writes.

Figure 14:
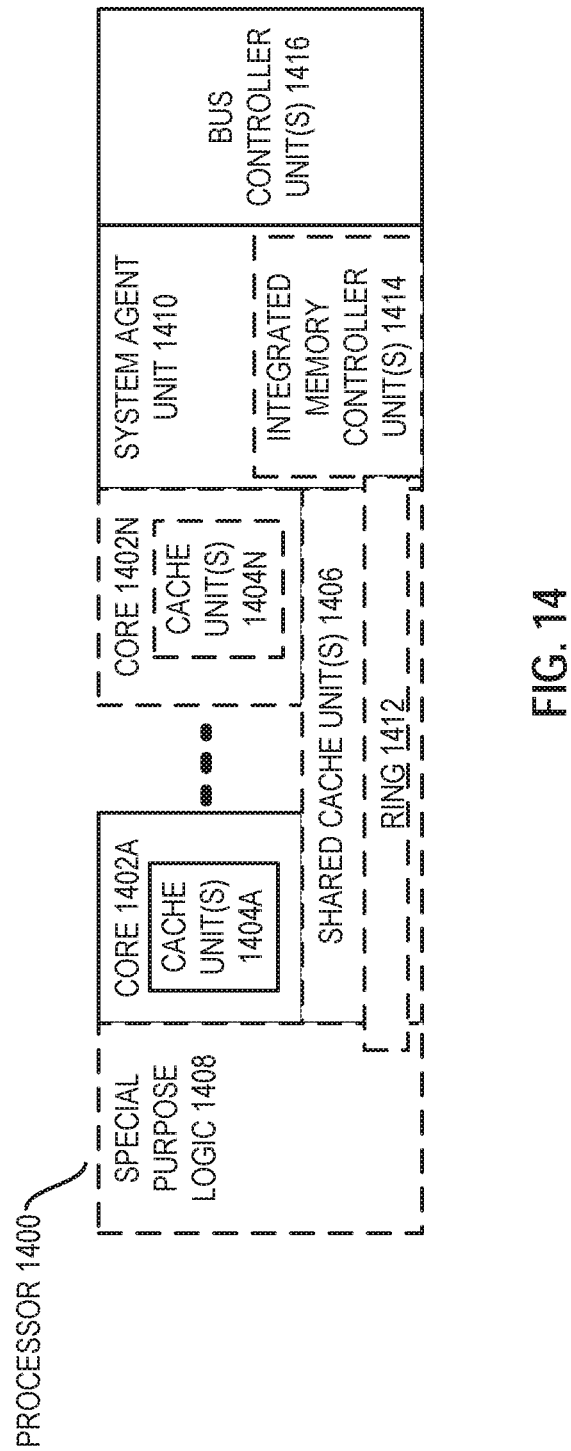
FIG. 14 is a block diagram of a processor that may have more than one core, may have an integrated memory controller, and may have integrated graphics according to embodiments of the disclosure.

FIG. 14 is a block diagram of a processor 1400 that may have more than one core, may have an integrated memory controller, and may have integrated graphics according to embodiments of the disclosure. The solid lined boxes in FIG. 14 illustrate a processor 1400 with a single core 1402A, a system agent 1410, a set of one or more bus controller units 1416, while the optional addition of the dashed lined boxes illustrates an alternative processor 1400 with multiple cores 1402A-N, a set of one or more integrated memory controller unit(s) 1414 in the system agent unit 1410, and special purpose logic 1408.

Thus, different implementations of the processor 1400 may include: 1) a CPU with the special purpose logic 1408 being integrated graphics and/or scientific (throughput) logic (which may include one or more cores), and the cores 1402A-N being one or more general purpose cores (e.g., general purpose in-order cores, general purpose out-of-order cores, a combination of the two); 2) a coprocessor with the cores 1402A-N being a large number of special purpose cores intended primarily for graphics and/or scientific (throughput); and 3) a coprocessor with the cores 1402A-N being a large number of general purpose in-order cores. Thus, the processor 1400 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1400 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1406, and external memory (not shown) coupled to the set of integrated memory controller units 1414. The set of shared cache units 1406 may include one or more mid-level caches, such as level 2 (L2), level 3 (L3), level 4 (L4), or other levels of cache, a last level cache (LLC), and/or combinations thereof. While in one embodiment a ring based interconnect unit 1412 interconnects the integrated graphics logic 1408, the set of shared cache units 1406, and the system agent unit 1410/integrated memory controller unit(s) 1414, alternative embodiments may use any number of well-known techniques for interconnecting such units. In one embodiment, coherency is maintained between one or more cache units 1406 and cores 1402-A-N.

In some embodiments, one or more of the cores 1402A-N are capable of multithreading. The system agent 1410 includes those components coordinating and operating cores 1402A-N. The system agent unit 1410 may include for example a power control unit (PCU) and a display unit. The PCU may be or include logic and components needed for regulating the power state of the cores 1402A-N and the integrated graphics logic 1408. The display unit is for driving one or more externally connected displays.

The cores 1402A-N may be homogenous or heterogeneous in terms of architecture instruction set; that is, two or more of the cores 1402A-N may be capable of execution the same instruction set, while others may be capable of executing only a subset of that instruction set or a different instruction set.

Exemplary Computer Architectures

FIGS. 15-18 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 15:
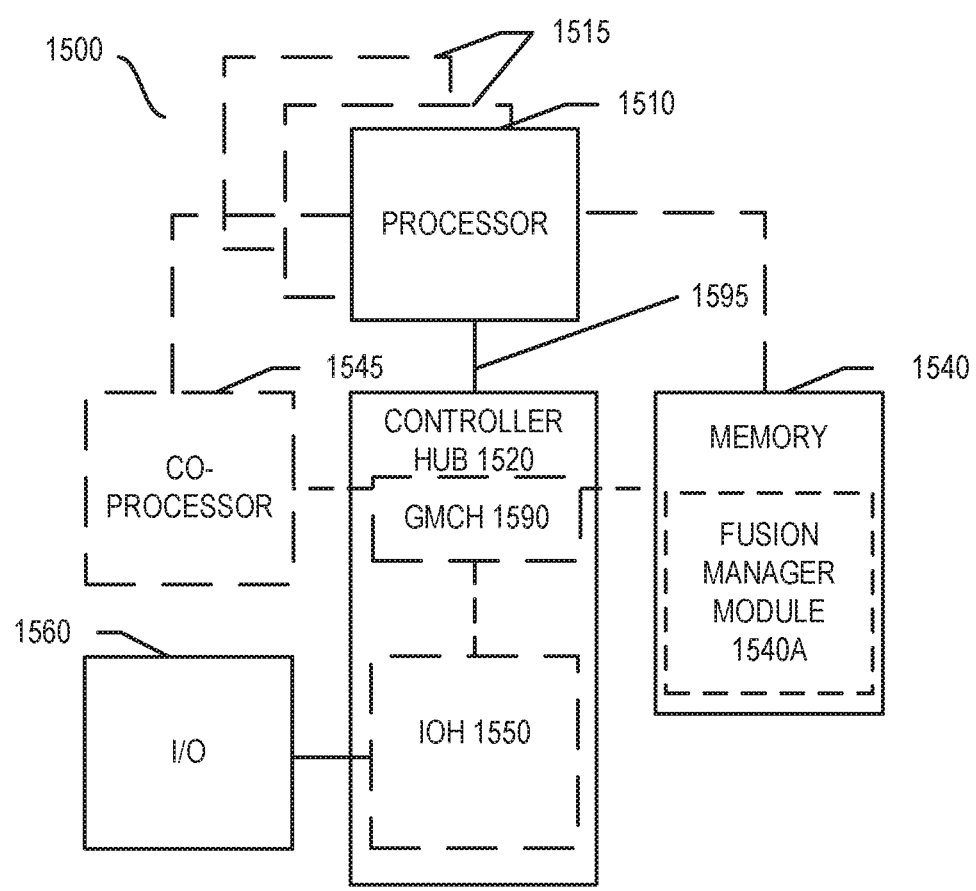
FIG. 15 is a block diagram of a system in accordance with one embodiment of the present disclosure.

Referring now to FIG. 15, shown is a block diagram of a system 1500 in accordance with one embodiment of the present disclosure. The system 1500 may include one or more processors 1510, 1515, which are coupled to a controller hub 1520. In one embodiment the controller hub 1520 includes a graphics memory controller hub (GMCH) 1590 and an Input/Output Hub (IOH) 1550 (which may be on separate chips); the GMCH 1590 includes memory and graphics controllers to which are coupled memory 1540 and a coprocessor 1545; the IOH 1550 is couples input/output (I/O) devices 1560 to the GMCH 1590. Alternatively, one or both of the memory and graphics controllers are integrated within the processor (as described herein), the memory 1540 and the coprocessor 1545 are coupled directly to the processor 1510, and the controller hub 1520 in a single chip with the IOH 1550. Memory 1540 may include a fusion manager module 1540A, for example, to store code that when executed causes a processor to perform any method of this disclosure.

The optional nature of additional processors 1515 is denoted in FIG. 15 with broken lines. Each processor 1510, 1515 may include one or more of the processing cores described herein and may be some version of the processor 1400.

The memory 1540 may be, for example, dynamic random access memory (DRAM), phase change memory (PCM), or a combination of the two. For at least one embodiment, the controller hub 1520 communicates with the processor(s) 1510, 1515 via a multi-drop bus, such as a frontside bus (FSB), point-to-point interface such as QuickPath Interconnect (QPI), or similar connection 1595.

In one embodiment, the coprocessor 1545 is a special-purpose processor, such as, for example, a high-throughput MIC processor, a network or communication processor, compression engine, graphics processor, GPGPU, embedded processor, or the like. In one embodiment, controller hub 1520 may include an integrated graphics accelerator.

There can be a variety of differences between the physical resources 1510, 1515 in terms of a spectrum of metrics of merit including architectural, microarchitectural, thermal, power consumption characteristics, and the like.

In one embodiment, the processor 1510 executes instructions that control data processing operations of a general type. Embedded within the instructions may be coprocessor instructions. The processor 1510 recognizes these coprocessor instructions as being of a type that should be executed by the attached coprocessor 1545. Accordingly, the processor 1510 issues these coprocessor instructions (or control signals representing coprocessor instructions) on a coprocessor bus or other interconnect, to coprocessor 1545. Coprocessor(s) 1545 accept and execute the received coprocessor instructions.

Figure 16:
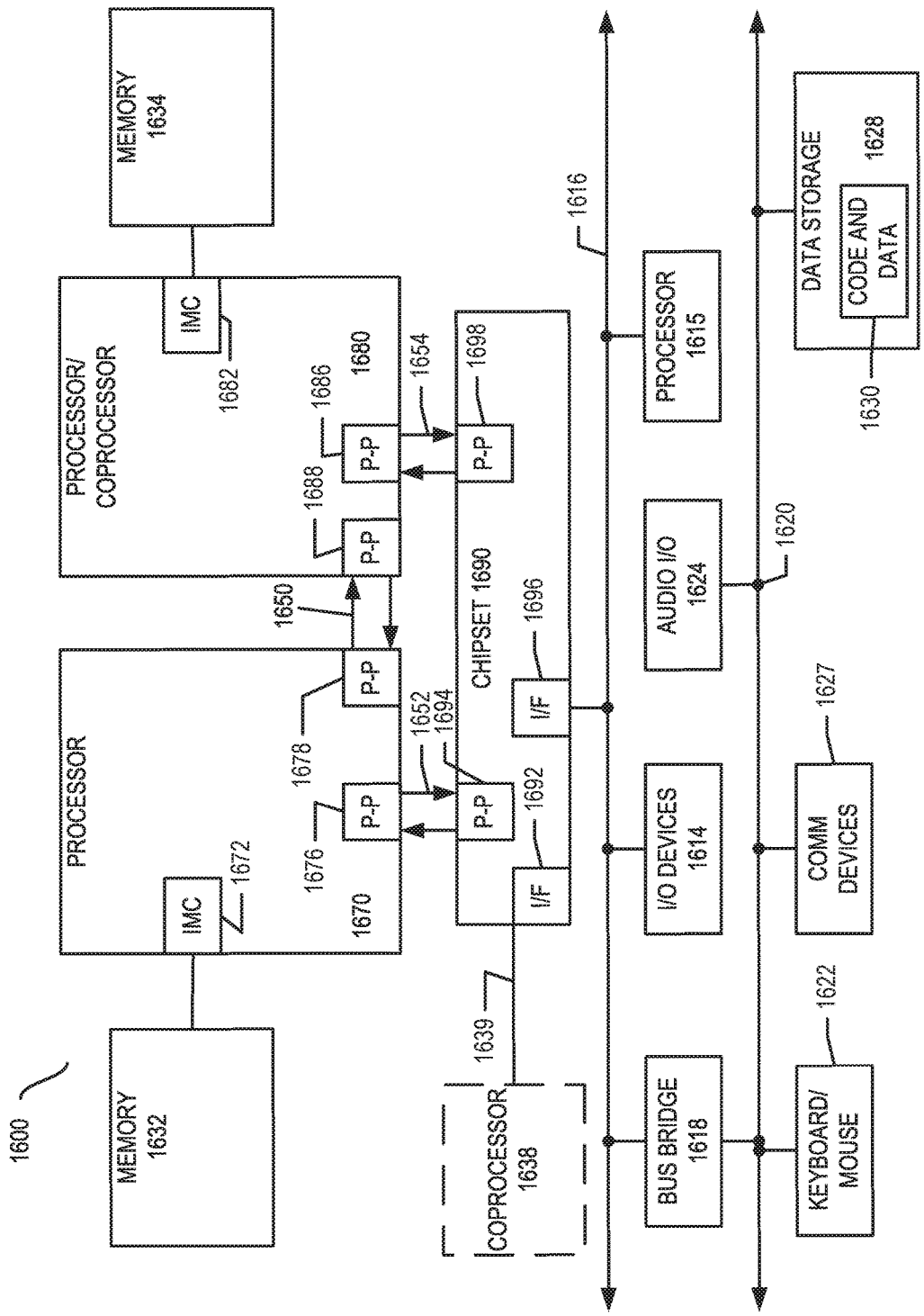
FIG. 16 is a block diagram of a more specific exemplary system in accordance with an embodiment of the present disclosure.

Referring now to FIG. 16, shown is a block diagram of a first more specific exemplary system 1600 in accordance with an embodiment of the present disclosure. As shown in FIG. 16, multiprocessor system 1600 is a point-to-point interconnect system, and includes a first processor 1670 and a second processor 1680 coupled via a point-to-point interconnect 1650. Each of processors 1670 and 1680 may be some version of the processor 1400. In one embodiment of the disclosure, processors 1670 and 1680 are respectively processors 1510 and 1515, while coprocessor 1638 is coprocessor 1545. In another embodiment, processors 1670 and 1680 are respectively processor 1510 coprocessor 1545.

Processors 1670 and 1680 are shown including integrated memory controller (IMC) units 1672 and 1682, respectively. Processor 1670 also includes as part of its bus controller units point-to-point (P-P) interfaces 1676 and 1678; similarly, second processor 1680 includes P-P interfaces 1686 and 1688. Processors 1670, 1680 may exchange information via a point-to-point (P-P) interface 1650 using P-P interface circuits 1678, 1688. As shown in FIG. 16, IMCs 1672 and 1682 couple the processors to respective memories, namely a memory 1632 and a memory 1634, which may be portions of main memory locally attached to the respective processors.

Processors 1670, 1680 may each exchange information with a chipset 1690 via individual P-P interfaces 1652, 1654 using point to point interface circuits 1676, 1694, 1686, 1698. Chipset 1690 may optionally exchange information with the coprocessor 1638 via a high-performance interface 1639. In one embodiment, the coprocessor 1638 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1690 may be coupled to a first bus 1616 via an interface 1696. In one embodiment, first bus 1616 may be a Peripheral Component Interconnect (PCI) bus, or a bus such as a PCI Express bus or another third generation I/O interconnect bus, although the scope of the present disclosure is not so limited.

As shown in FIG. 16, various I/O devices 1614 may be coupled to first bus 1616, along with a bus bridge 1618 which couples first bus 1616 to a second bus 1620. In one embodiment, one or more additional processor(s) 1615, such as coprocessors, high-throughput MIC processors, GPGPU's, accelerators (such as, e.g., graphics accelerators or digital signal processing (DSP) units), field programmable gate arrays, or any other processor, are coupled to first bus 1616. In one embodiment, second bus 1620 may be a low pin count (LPC) bus. Various devices may be coupled to a second bus 1620 including, for example, a keyboard and/or mouse 1622, communication devices 1627 and a storage unit 1628 such as a disk drive or other mass storage device which may include instructions/code and data 1630, in one embodiment. Further, an audio I/O 1624 may be coupled to the second bus 1620. Note that other architectures are possible. For example, instead of the point-to-point architecture of FIG. 16, a system may implement a multi-drop bus or other such architecture.

Figure 17:
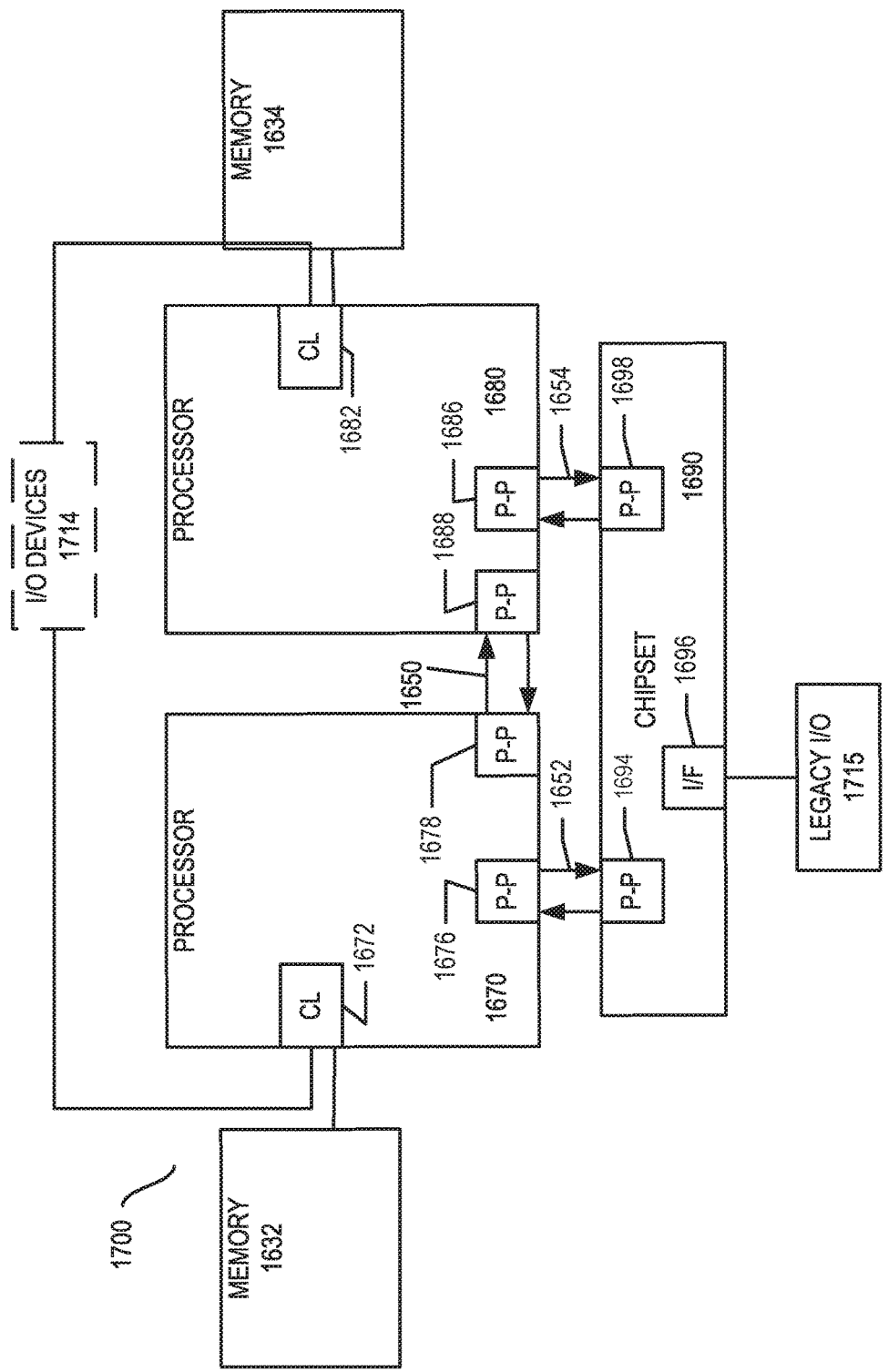
FIG. 17, shown is a block diagram of a second more specific exemplary system in accordance with an embodiment of the present disclosure.

Referring now to FIG. 17, shown is a block diagram of a second more specific exemplary system 1700 in accordance with an embodiment of the present disclosure Like elements in FIGS. 16 and 17 bear like reference numerals, and certain aspects of FIG. 16 have been omitted from FIG. 17 in order to avoid obscuring other aspects of FIG. 17.

FIG. 17 illustrates that the processors 1670, 1680 may include integrated memory and I/O control logic ("CL") 1672 and 1682, respectively. Thus, the CL 1672, 1682 include integrated memory controller units and include I/O control logic. FIG. 17 illustrates that not only are the memories 1632, 1634 coupled to the CL 1672, 1682, but also that I/O devices 1714 are also coupled to the control logic 1672, 1682. Legacy I/O devices 1715 are coupled to the chipset 1690.

Figure 18:
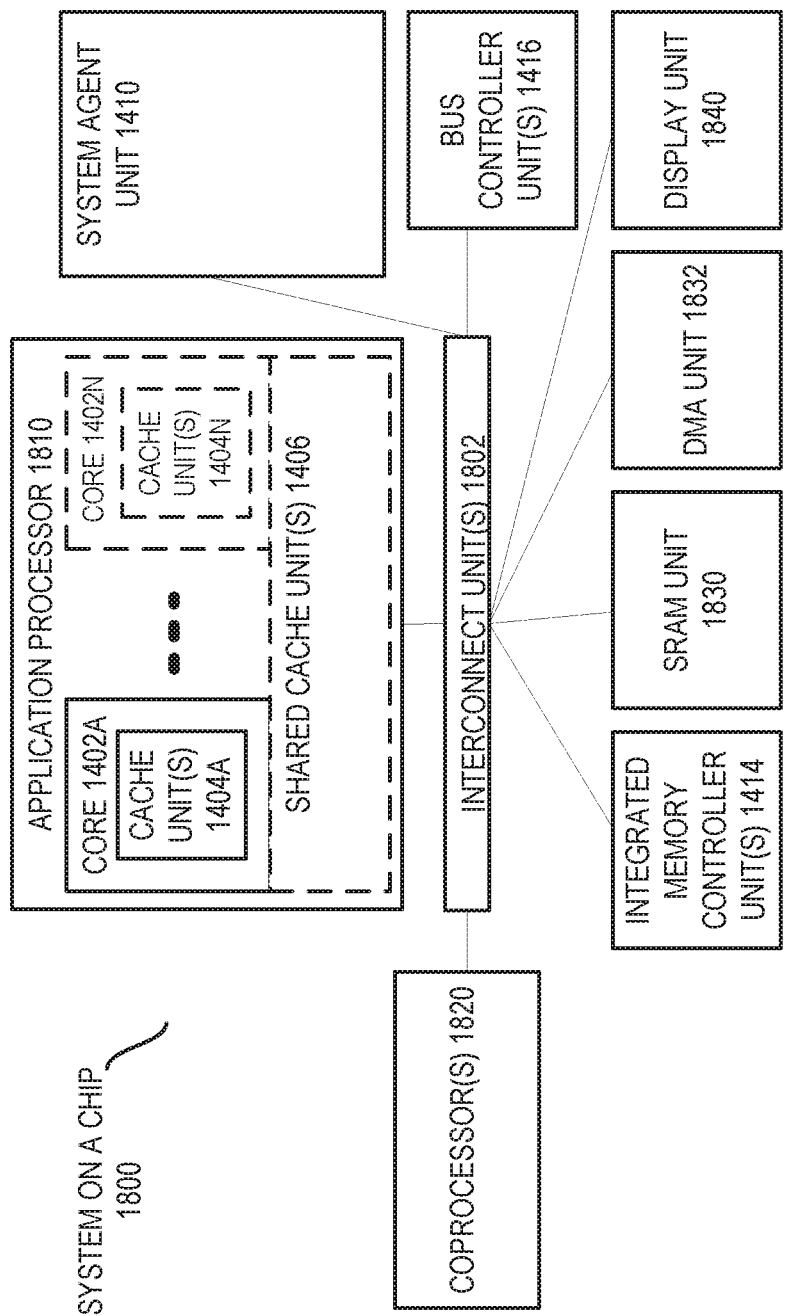
FIG. 18, shown is a block diagram of a system on a chip (SoC) in accordance with an embodiment of the present disclosure.

Referring now to FIG. 18, shown is a block diagram of a SoC 1800 in accordance with an embodiment of the present disclosure. Similar elements in FIG. 14 bear like reference numerals. Also, dashed lined boxes are optional features on more advanced SoCs. In FIG. 18, an interconnect unit(s) 1802 is coupled to: an application processor 1810 which includes a set of one or more cores 202A-N and shared cache unit(s) 1406; a system agent unit 1410; a bus controller unit(s) 1416; an integrated memory controller unit(s) 1414; a set or one or more coprocessors 1820 which may include integrated graphics logic, an image processor, an audio processor, and a video processor; an static random access memory (SRAM) unit 1830; a direct memory access (DMA) unit 1832; and a display unit 1840 for coupling to one or more external displays. In one embodiment, the coprocessor(s) 1820 include a special-purpose processor, such as, for example, a network or communication processor, compression engine, GPGPU, a high-throughput MIC processor, embedded processor, or the like.

Embodiments (e.g., of the mechanisms) disclosed herein may be implemented in hardware, software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device.

Program code, such as code 1630 illustrated in FIG. 16, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 19 is a block diagram contrasting the use of a software instruction converter to convert binary instructions in a source instruction set to binary instructions in a target instruction set according to embodiments of the disclosure. In the illustrated embodiment, the instruction converter is a software instruction converter, although alternatively the instruction converter may be implemented in software, firmware, hardware, or various combinations thereof. FIG. 19 shows a program in a high level language 1902 may be compiled using an x86 compiler 1904 to generate x86 binary code 1906 that may be natively executed by a processor with at least one x86 instruction set core 1916. The processor with at least one x86 instruction set core 1916 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1904 represents a compiler that is operable to generate x86 binary code 1906 (e.g., object code) that can, with or without additional linkage processing, be executed on the processor with at least one x86 instruction set core 1916. Similarly, FIG. 19 shows the program in the high level language 1902 may be compiled using an alternative instruction set compiler 1908 to generate alternative instruction set binary code 1910 that may be natively executed by a processor without at least one x86 instruction set core 1914 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1912 is used to convert the x86 binary code 1906 into code that may be natively executed by the processor without an x86 instruction set core 1914. This converted code is not likely to be the same as the alternative instruction set binary code 1910 because an instruction converter capable of this is difficult to make; however, the converted code will accomplish the general operation and be made up of instructions from the alternative instruction set. Thus, the instruction converter 1912 represents software, firmware, hardware, or a combination thereof that, through emulation, simulation or any other process, allows a processor or other electronic device that does not have an x86 instruction set processor or core to execute the x86 binary code 1906.

What is claimed is:

1. A hardware processor comprising:
    a hardware binary translator to translate an instruction stream into a translated instruction stream;
    a hardware fusion manager to fuse multiple instructions of the translated instruction stream into a single fused instruction, the hardware fusion manager to:
        detect a load instruction and an instruction that is to read a result of the load instruction in the translated instruction stream,
        fuse the load instruction and the instruction that is to read the result of the load instruction into the single fused instruction when the load instruction is determined to be a zero extending load instruction, and
        not fuse the load instruction and the instruction that is to read the result of the load instruction into the single fused instruction when the load instruction is determined to not be a zero extending load instruction;
    a hardware decode unit to decode the single fused instruction into a decoded, single fused instruction; and
    a hardware execution unit to execute the decoded, single fused instruction.

2. The hardware processor of claim 1, wherein the hardware fusion manager is to not fuse the zero extending load instruction and the instruction that is to read the result of the zero extending load instruction into the single fused instruction unless a later instruction that is to overwrite the result of the zero extending load instruction is detected.

3. The hardware processor of claim 1, wherein the hardware fusion manager is to not fuse the zero extending load instruction and the instruction that is to read the result of the zero extending load instruction if the hardware fusion manager detects a control flow instruction therebetween.

4. The hardware processor of claim 1, wherein the hardware fusion manager is to:
    detect, in the translated instruction stream, an instruction that is to produce a result and a store instruction that is to read the result, and
    fuse the instruction that is to produce the result and the store instruction that is to read the result into the single fused instruction.

5. The hardware processor of claim 4, wherein the hardware fusion manager is to not fuse the instruction that is to produce the result and the store instruction that is to read the result if the hardware fusion manager detects any instruction of the translated instruction stream between the instruction that is to produce the result and the store instruction that is to read the result that is also to read the result.

6. The hardware processor of claim 4, wherein the hardware fusion manager is to not fuse the instruction that is to produce the result and the store instruction that is to read the result if the hardware fusion manager detects:

any instruction of the translated instruction stream that is also to read the result between the instruction that is to produce the result and the store instruction that is to read the result, and the single fused instruction is to overwrite the result.

7. The hardware processor of claim 1, wherein the instruction stream is a stream of macro-instructions.

8. The hardware processor of claim 4, wherein the hardware fusion manager is to fuse the instruction that is to produce the result and the store instruction that is to read the result if:

the hardware fusion manager detects any instruction of the translated instruction stream therebetween that is also to read the result, and the hardware fusion manager relocates the any instruction to be after the store instruction in the translated instruction stream.

9. A method comprising:
translating an instruction stream into a translated instruction stream with a binary translator;
fusing multiple instructions of the translated instruction stream into a single fused instruction with a fusion manager, the fusing comprising:
detecting a load instruction and an instruction that is to read a result of the load instruction in the translated instruction stream,
fusing the load instruction and the instruction that is to read the result of the load instruction into the single fused instruction when the load instruction is a zero extending load instruction, and
not fusing the load instruction and the instruction that is to read the result of the load instruction into the single fused instruction when the load instruction is determined to not be a zero extending load instruction;
decoding the single fused instruction into a decoded, single fused instruction with a hardware decode unit of a hardware processor; and
executing the decoded, single fused instruction with a hardware execution unit of the hardware processor.

10. The method of claim 9, further comprising not fusing the zero extending load instruction and the instruction that is to read the result of the zero extending load instruction into the single fused instruction unless a later instruction that is to overwrite the result of the zero extending load instruction is detected.

11. The method of claim 9, further comprising not fusing the zero extending load instruction and the instruction that is to read the result of the zero extending load instruction if the fusion manager detects a control flow instruction therebetween.

12. The method of claim 9, wherein the fusing comprises:
detecting, in the translated instruction stream, an instruction that is to produce a result and a store instruction that is to read the result, and
fusing the instruction that is to produce the result and the store instruction that is to read the result into the single fused instruction.

13. The method of claim 12, further comprising not fusing the instruction that is to produce the result and the store instruction that is to read the result if the fusion manager detects any instruction of the translated instruction stream between the instruction that is to produce the result and the store instruction that is to read the result that is also to read the result.

14. The method of claim 12, further comprising not fusing the instruction that is to produce the result and the store instruction that is to read the result if the fusion manager detects:

any instruction of the translated instruction stream that is also to read the result between the instruction that is to produce the result and the store instruction that is to read the result, and the single fused instruction is to overwrite the result.

15. The method of claim 9, wherein the instruction stream is a stream of macro-instructions.

16. The method of claim 12, wherein the fusing comprises fusing the instruction that is to produce the result and the store instruction that is to read the result if:

the fusion manager detects any instruction of the translated instruction stream therebetween that is also to read the result, and the fusion manager relocates the any instruction to be after the store instruction in the translated instruction stream.

17. A non-transitory machine readable medium that stores code that when executed by a machine causes the machine to perform a method comprising:
translating an instruction stream into a translated instruction stream with a binary translator;
fusing multiple instructions of the translated instruction stream into a single fused instruction with a fusion manager, the fusing comprising:
detecting a load instruction and an instruction that is to read a result of the load instruction in the translated instruction stream,
fusing the load instruction and the instruction that is to read the result of the load instruction into the single fused instruction when the load instruction is a zero extending load instruction, and
not fusing the load instruction and the instruction that is to read the result of the load instruction into the single fused instruction when the load instruction is determined to not be a zero extending load instruction;
decoding the single fused instruction into a decoded, single fused instruction; and
executing the decoded, single fused instruction.

18. The non-transitory machine readable medium of claim 17, wherein the method comprises:
not fusing the zero extending load instruction and the instruction that is to read the result of the zero extending load instruction into the single fused instruction unless a later instruction that is to overwrite the result of the zero extending load instruction is detected.

19. The non-transitory machine readable medium of claim 17, wherein the method comprises:
not fusing the zero extending load instruction and the instruction that is to read the result of the zero extending load instruction if the fusion manager detects a control flow instruction therebetween.

20. The non-transitory machine readable medium of claim 17, wherein the method comprises:
wherein the fusing comprises:
detecting, in the translated instruction stream, an instruction that is to produce a result and a store instruction that is to read the result, and
fusing the instruction that is to produce the result and the store instruction that is to read the result into the single fused instruction.

21. The non-transitory machine readable medium of claim 20, wherein the method comprises:
not fusing the instruction that is to produce the result and the store instruction that is to read the result if the fusion manager detects any instruction of the translated instruction stream between the instruction that is to produce the result and the store instruction that is to read the result that is also to read the result.

22. The non-transitory machine readable medium of claim 20, wherein the method comprises:
not fusing the instruction that is to produce the result and the store instruction that is to read the result if the fusion manager detects:
any instruction of the translated instruction stream that is also to read the result between the instruction that is to produce the result and the store instruction that is to read the result, and
the single fused instruction is to overwrite the result.

23. The non-transitory machine readable medium of claim 17, wherein the instruction stream is a stream of macro-instructions.

24. The non-transitory machine readable medium of claim 20, wherein the method comprises:
wherein the fusing comprises fusing the instruction that is to produce the result and the store instruction that is to read the result if:
the fusion manager detects any instruction of the translated instruction stream therebetween that is also to read the result, and
the fusion manager relocates the any instruction to be after the store instruction in the translated instruction stream.

* * * * *